United States Patent
Finn et al.

(10) Patent No.: US 12,159,180 B1
(45) Date of Patent: Dec. 3, 2024

(54) RFID ENABLED METAL TRANSACTION CARDS WITH COUPLER COIL COUPLINGS AND RELATED METHODS

(71) Applicant: Metaland LLC, Doral, FL (US)

(72) Inventors: David Finn, Füssen Weissensee (DE); Darren Molloy, Ballinrobe (IE)

(73) Assignee: Metaland LLC, Doral, FL (US)

( * ) Notice: Subject to any disclaimer, the term of this patent is extended or adjusted under 35 U.S.C. 154(b) by 32 days.

(21) Appl. No.: 17/994,729

(22) Filed: Nov. 28, 2022

Related U.S. Application Data

(60) Provisional application No. 63/283,561, filed on Nov. 29, 2021.

(51) Int. Cl.
G06K 19/077 (2006.01)
G06K 19/07 (2006.01)

(52) U.S. Cl.
CPC ... G06K 19/07722 (2013.01); G06K 19/0709 (2013.01); G06K 19/0723 (2013.01)

(58) Field of Classification Search
CPC ............. G06K 19/07722; G06K 19/0709
USPC .......................................................... 235/488
See application file for complete search history.

(56) References Cited

U.S. PATENT DOCUMENTS

| | | | |
|---|---|---|---|
| 6,378,774 B1 | 4/2002 | Emori et al. | |
| 6,452,563 B1 | 9/2002 | Porte | |
| 6,491,229 B1 | 12/2002 | Berney | |
| 7,701,350 B2 | 4/2010 | Sakama et al. | |
| 8,608,082 B2 | 12/2013 | Le Garrec et al. | |
| 8,737,915 B2 | 5/2014 | Beenken | |
| 8,944,810 B2 | 2/2015 | Herslow | |
| 9,024,763 B2 | 5/2015 | Hamedani | |
| 9,231,305 B2 | 1/2016 | Kato | |
| 9,390,366 B1 | 7/2016 | Herslow et al. | |
| 9,475,086 B2 | 10/2016 | Finn et al. | |
| 9,564,678 B2 | 2/2017 | Kato et al. | |
| 9,569,718 B2 | 2/2017 | Herslow | |
| 9,697,459 B2 | 7/2017 | Finn et al. | |
| 9,812,782 B2 | 7/2017 | Finn et al. | |
| 9,721,200 B2 | 8/2017 | Herslow et al. | |
| 9,760,816 B1 | 9/2017 | Williams et al. | |

(Continued)

FOREIGN PATENT DOCUMENTS

CN 205158409 U 4/2016
EP 0494471 A1 7/1992

(Continued)

OTHER PUBLICATIONS

U.S. Appl. No. 17/882,569, filed Aug. 7, 2022.

(Continued)

*Primary Examiner* — Allyson N Trail
(74) *Attorney, Agent, or Firm* — Frost Brown Todd LLP

(57) ABSTRACT

A transaction card for dual interface communication of a transaction includes a front metal layer without a front discontinuity, a rear metal layer having a rear discontinuity, a chip opening, a transponder chip module, and a booster antenna circuit. The transponder chip module has a module antenna and is received within the chip opening. The booster antenna circuit includes a coupler coil disposed between the front and rear metal layers. In addition, the coupler coil is configured to inductively couple with the rear metal layer for harvesting energy from an electromagnetic field.

20 Claims, 12 Drawing Sheets

(56) References Cited

U.S. PATENT DOCUMENTS

| | | | |
|---|---|---|---|
| 9,798,968 B2 | 10/2017 | Finn et al. |
| 9,836,684 B2 | 12/2017 | Finn et al. |
| 9,836,687 B1 | 12/2017 | Williams et al. |
| 9,881,247 B2 | 1/2018 | Le Garrec et al. |
| 9,898,699 B2 | 2/2018 | Herslow et al. |
| 9,960,476 B2 | 5/2018 | Finn et al. |
| 10,089,570 B2 | 10/2018 | Herslow et al. |
| 10,140,569 B2 | 11/2018 | Kim et al. |
| 10,193,211 B2 | 1/2019 | Finn et al. |
| 10,248,902 B1 | 4/2019 | Finn et al. |
| 10,248,903 B2 | 4/2019 | Williams et al. |
| 10,275,703 B2 | 4/2019 | Herslow et al. |
| 10,289,944 B2 | 5/2019 | Herslow et al. |
| 10,318,859 B2 | 6/2019 | Lowe et al. |
| 10,406,734 B2 | 9/2019 | Lowe |
| D864,293 S | 10/2019 | Lowe et al. |
| 10,518,518 B2 | 12/2019 | Finn et al. |
| 10,534,990 B2 | 1/2020 | Herslow et al. |
| 10,552,722 B2 | 2/2020 | Finn et al. |
| D879,196 S | 3/2020 | Lowe et al. |
| 10,583,594 B2 | 3/2020 | Lowe |
| 10,599,972 B2 | 3/2020 | Finn et al. |
| 10,733,494 B2 | 8/2020 | Finn et al. |
| 10,748,049 B2 | 8/2020 | Herslow et al. |
| 10,762,412 B2 | 9/2020 | Lowe et al. |
| 10,783,426 B2 | 9/2020 | Finn et al. |
| 10,824,931 B2 | 11/2020 | Finn et al. |
| 10,885,419 B2 | 1/2021 | Lowe et al. |
| 10,909,436 B2 | 2/2021 | Coleman |
| 10,926,439 B2 | 2/2021 | Lowe |
| 10,977,540 B2 | 4/2021 | Lowe |
| 10,977,542 B2 | 4/2021 | Lotya et al. |
| 11,009,855 B2 | 5/2021 | Nam et al. |
| 11,037,044 B2 | 6/2021 | Lotya et al. |
| 11,113,593 B2 | 9/2021 | Finn |
| 11,151,437 B2 | 10/2021 | Lowe et al. |
| 11,182,662 B2 | 11/2021 | Lowe |
| 11,195,075 B2 | 12/2021 | Coleman |
| 11,226,610 B2 | 1/2022 | Cox |
| 11,227,201 B1 | 1/2022 | Williams et al. |
| 11,232,341 B2 | 1/2022 | Lowe et al. |
| D943,669 S | 2/2022 | Lowe et al. |
| D943,670 S | 2/2022 | Lowe et al. |
| D944,322 S | 2/2022 | Lowe et al. |
| D944,323 S | 2/2022 | Lowe et al. |
| 11,247,371 B2 | 2/2022 | Lowe |
| 11,250,305 B2 | 2/2022 | Finn |
| 11,267,172 B2 | 3/2022 | Lowe |
| D948,613 S | 4/2022 | Lowe et al. |
| 11,301,743 B2 | 4/2022 | Lowe et al. |
| 11,301,744 B2 | 4/2022 | Herslow et al. |
| 11,315,002 B2 | 4/2022 | Lowe et al. |
| 11,315,003 B2 | 4/2022 | Finn |
| 11,341,385 B2 | 5/2022 | Finn |
| 11,341,389 B2 | 5/2022 | Lotya et al. |
| 11,347,993 B2 | 5/2022 | Finn |
| 11,354,553 B2 | 6/2022 | Seban et al. |
| 11,354,558 B2 | 6/2022 | Lotya et al. |
| 11,354,560 B2 | 6/2022 | Lotya et al. |
| 11,359,084 B2 | 6/2022 | Cox |
| 11,359,085 B2 | 6/2022 | Cox |
| 11,361,204 B2 | 6/2022 | Cox |
| 11,386,317 B2 | 7/2022 | Lotya et al. |
| 11,390,737 B2 | 7/2022 | Cox |
| 11,392,817 B2 | 7/2022 | Lotya et al. |
| 11,410,010 B2 | 8/2022 | Lotya et al. |
| 11,416,728 B2 | 8/2022 | Finn et al. |
| 11,455,507 B2 | 9/2022 | Finn |
| 11,461,608 B2 | 10/2022 | Lowe |
| 11,481,596 B2 | 10/2022 | Lotya et al. |
| 11,501,128 B2 | 11/2022 | Lowe et al. |
| 11,514,288 B2 | 11/2022 | Lotya et al. |
| 11,551,049 B2 * | 1/2023 | Suthar ................ B32B 27/308 |
| 11,551,051 B2 | 1/2023 | Lotya |
| 11,555,108 B2 | 1/2023 | Cox |
| 11,568,195 B2 | 1/2023 | Lotya et al. |
| 11,618,191 B2 | 4/2023 | Lowe et al. |
| 2011/0181486 A1 | 7/2011 | Kato |
| 2011/0227799 A1 | 9/2011 | Hashimoto |
| 2012/0112971 A1 | 5/2012 | Takeyama et al. |
| 2013/0126622 A1 | 5/2013 | Finn |
| 2014/0231503 A1 | 8/2014 | Arimura |
| 2015/0221624 A1 | 8/2015 | Ye et al. |
| 2019/0156073 A1 | 5/2019 | Finn et al. |
| 2019/0171923 A1 | 6/2019 | Finn |
| 2019/0286961 A1 | 9/2019 | Lowe |
| 2019/0384261 A1 | 12/2019 | Nam et al. |
| 2019/0385035 A1 | 12/2019 | Mosteller et al. |
| 2020/0034578 A1 | 1/2020 | Finn et al. |
| 2020/0151535 A1 | 5/2020 | Herslow et al. |
| 2021/0049431 A1 | 2/2021 | Finn |
| 2021/0081743 A1 | 3/2021 | Finn et al. |
| 2021/0081748 A1 | 3/2021 | Finn |
| 2021/0154898 A1 | 5/2021 | Lowe et al. |
| 2021/0174159 A1 | 6/2021 | Finn |
| 2021/0232887 A1 | 7/2021 | Ritter |
| 2021/0256341 A1 | 8/2021 | Lotya et al. |
| 2022/0036149 A1 | 2/2022 | Lowe |
| 2022/0051064 A1 | 2/2022 | Lowe |
| 2022/0058457 A1 | 2/2022 | Meridiano et al. |
| 2022/0138522 A1 | 5/2022 | Lotya et al. |
| 2022/0230044 A1 | 7/2022 | Lowe et al. |
| 2022/0237423 A1 * | 7/2022 | Lotya ................ G06K 19/07722 |
| 2022/0253661 A1 | 8/2022 | Daley et al. |
| 2022/0327340 A1 | 10/2022 | Cox |
| 2022/0343129 A1 | 10/2022 | Lowe |
| 2023/0027226 A1 | 1/2023 | Lotya et al. |
| 2023/0045326 A1 * | 2/2023 | Placitelli ............ G06K 19/0772 |
| 2023/0086189 A1 | 3/2023 | Finn |
| 2023/0101906 A1 | 3/2023 | Lotya et al. |
| 2023/0116583 A1 | 4/2023 | Cox |
| 2023/0198140 A1 * | 6/2023 | Ali ................ H01L 23/49838 |
| 2024/0028860 A1 * | 1/2024 | Finn ................ G06K 19/07773 |

FOREIGN PATENT DOCUMENTS

| | | |
|---|---|---|
| EP | 2372840 | 10/2011 |
| JP | 2000 311225 A | 11/2000 |
| JP | 4016322 B2 | 12/2007 |
| KR | 10-1754985 | 7/2017 |
| WO | WO 2017/090891 | 6/2017 |
| WO | WO 2017/177905 | 10/2017 |
| WO | WO 2019/173455 A1 | 9/2019 |
| WO | WO 2021/110515 A1 | 6/2021 |
| WO | WO 2023/034642 A1 | 3/2023 |

OTHER PUBLICATIONS

U.S. Appl. No. 17/882,568, filed Aug. 7, 2022.
U.S. Appl. No. 17/903,886, filed Sep. 6, 2022.
U.S. Appl. No. 17/952,253, filed Sep. 24, 2022.
U.S. Appl. No. 18/157,841, filed Jan. 22, 2023.
International Search Report and Written Opinion dated Feb. 2, 2023 for Application No. PCT/US22/042657, 9 pages.
Sung-Lin Chen Shih-Kang Kuo Chang-Tsun Lin, "A Metallic RFID Tag Design for Steel-Bar and Wire-Rod Management Application in the Steel Industry," Progress In Electromagnetics Research, vol. 91, 195-212, 2009. doi:10.2528/PIER09021304 http://www.jpier.org/PIER/pier.php?paper-09021304.

\* cited by examiner

RFID ENABLED METAL TRANSACTION CARDS WITH COUPLER COIL COUPLINGS AND RELATED METHODS

CROSS-REFERENCE TO RELATED APPLICATION

This application claims priority to application Ser. No. 63/283,561, filed on Nov. 29, 2021, entitled "RFID Enabled Metal Transaction Cards," the disclosure of which is hereby expressly incorporated by reference herein, in its entirety.

TECHNICAL FIELD

The present invention relates generally to a transaction card, and more particularly, to a transaction card having a metal layer.

BACKGROUND

Transaction cards, such as payment cards, including credit cards and debit cards, which may also be referred to as smartcards, are well known in the financial industry and to associated customers. In order to increase the perceived prestige of such cards as well as improve wear resistance and functionality, many transaction cards include one or more metal layers, referred to herein as "metal transaction cards." While beneficial in some aspects, the incorporation of one or more metal layers introduces other challenges into the design, development, and manufacture of metal transaction cards, particularly with respect to various security features also incorporated into the metal transaction card as desired, or even expected, by the financial industry. For example, some embedded payment chip modules, referred to as "dual interface chip modules," have dual functionality for contact and contactless transmission of information during a transaction, such as a point of sale (POS) transaction. In a first instance of contact transmission, the dual interface chip module of the metal transaction card has a plurality of contact pads configured to communicate in direct contact with a card reader. In a second instance of contactless transmission, also referred to as "Tap-to-Pay," the dual interface chip module of the metal transaction card has a radio frequency identification (RFID) antenna for contactless communication with the card reader. However, metal transaction cards may be functionally difficult to equip with radio frequency transmission capability due to the Faraday cage effect caused by these metal layers. In addition, metal layers tend to be more costly to produce than the ubiquitous "plastic" smartcard due to increased material costs and manufacturing complexities.

While many metal transaction cards have been made and used, it is believed that no one prior to the inventors has made or used the invention described in the appended claims.

BRIEF DESCRIPTION OF THE DRAWINGS

While the specification concludes with claims which particularly point out and distinctly claim this technology, it is believed this technology will be better understood from the following description of certain examples taken in conjunction with the accompanying drawings, in which like reference numerals identify the same elements and in which:

Figure 1:
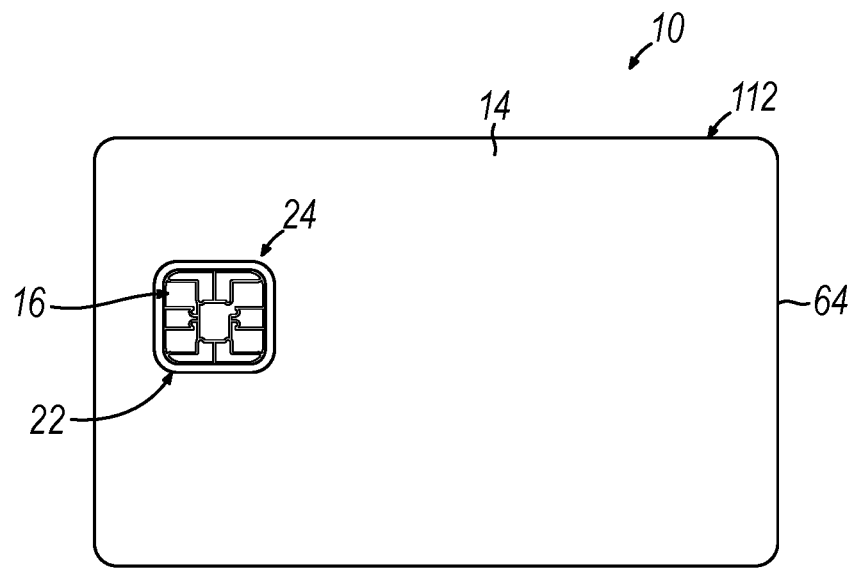
FIG. 1 depicts a front elevational view of a first example of a metal transaction card having a first exemplary inductive coupling arrangement.

The drawings are not intended to be limiting in any way, and it is contemplated that various embodiments of the technology may be carried out in a variety of other ways, including those not necessarily depicted in the drawings. The accompanying drawings incorporated in and forming a part of the specification illustrate several aspects of the present technology, and together with the description serve to explain the principles of the technology; it being understood, however, that this technology is not limited to the precise arrangements shown.

DETAILED DESCRIPTION

The following description of certain examples of the technology should not be used to limit its scope. Other examples, features, aspects, embodiments, and advantages of the technology will become apparent to those skilled in the art from the following description, which is by way of illustration, one of the best modes contemplated for carrying out the technology. As will be realized, the technology described herein is capable of other different and obvious aspects, all without departing from the technology. Accordingly, the drawings and descriptions should be regarded as illustrative in nature and not restrictive.

It is further understood that any one or more of the teachings, expressions, embodiments, examples, etc. described herein may be combined with any one or more of the other teachings, expressions, embodiments, examples, etc. that are described herein. The following-described teachings, expressions, embodiments, examples, etc. should therefore not be viewed in isolation relative to each other. Various suitable ways in which the teachings herein may be combined will be readily apparent to those of ordinary skill in the art in view of the teachings herein. Such modifications and variations are intended to be included within the scope of the claims.

For clarity and convenience of the following disclosures, it will be appreciated that, spatial terms, such as "front," "rear," "upper," "lower," "top," "bottom," "horizontal," "vertical," "transverse," "longitudinal," "underside," "inner," "outer, "interior," and "exterior" are used herein for reference to relative positions and directions. Such terms are used below with reference to views as illustrated for clarity and are not intended to limit the invention described herein.

The following glossary of various terms and explanations of certain physical phenomena may relate to general knowledge of one of ordinary skill as applied to one or more features discussed below. Notably, the following terms and explanations are included for illustrative purposes merely to provide additional clarity and not intended to be unnecessarily limited as described herein.

Booster Antenna: A booster antenna in a metal transaction card includes a card antenna with multiple windings extending around a periphery edge of a card body, a coupler coil positioned relative to a module antenna of a transponder chip module, and an extension antenna in one or more examples contributing to inductance and tuning of the booster antenna. In one example, a booster antenna is a wire embedded antenna, ultrasonically scribed into a synthetic layer forming part of a stack-up arrangement of a dual interface smartcard. The card antenna on the periphery of the card body inductively couples with the contactless reader while the coupler coil inductively couples with the module antenna driving the RFID chip.

Booster Antenna with a Perimeter Coil (which may be referred to as a Harvesting Coil), a Coupler Coil (which may be referred to as a Communication Coil), and Secondary Coil(s): The perimeter coil runs along the outer edge of the metal card body to pick-up surface currents to drive the transponder chip module via the coupler coil by means of inductive coupling. The perimeter coil follows the edges or ledges of the metal layer or layers which form the metal card body, and its path may overlap a boundary interface between a conductive (metal) and non-conductive (plastic) surface located within the card body construction. This may apply when the front face metal layer is continuous and extends edge to edge on all sides of the rectangular card body, while the rear metal layer is continuous or discontinuous. The rear metal layer may have a shaped cut-out segment(s) in the metal creating a boundary interface between the conductive metal layer and a non-conductive plastic layer, with the perimeter coil following the contour of the metal. The secondary coil has a range of functions including tuning, additional power generation, picking up surface currents at the metal edges and inner locations of the card body, coupling to other components such as to a biometric sensor, and customized to drive sound, piezo haptic actuator, light and display devices. The coupler coil connected to the perimeter coil and the secondary coil(s) overlaps the module antenna of the transponder chip module.

Compensating Loop: Used to stabilize the resonance frequency of a booster antenna. A metal compensating loop with a gap may be assembled underneath the booster antenna. A ferrite layer or layers may also be laminated together, in combination with the compensating loop on the reverse side of the booster antenna. Additional details regarding the compensating loop are described in U.S. Pat. Pub. No. 2013/0126622, entitled "Offsetting Shielding and Enhancing Coupling in Metallized Smart Cards," published May 23, 2013, hereby incorporated by reference herein.

Coupling Frame Antenna: A card size planar antenna having a single turn and representing a metal layer or metal card body with a discontinuity, with the width of the antenna track significantly greater than the skin depth at the frequency of interest.

Discontinuity in a Metal Layer or Metal Card Body acting a Coupling Frame: A discontinuity in a metal layer comprises a slit or gap in the metal layer extending from the front surface to the back surface, the discontinuity defining a path from an origin at the card periphery and terminating at a terminus in an opening to accept a transponder chip module. The metal layer may or may not be defined as reaching the periphery of the transaction card, and the slit geometries may be defined in terms of the card body, and not the coupling frame. A slit may be angled enough that it intersects the periphery of the card body above or below the Y-coordinates of the module opening to accept a transponder chip module.

Discontinuous Metal Frame: An "open loop" metal frame disposed around a peripheral area of a card body with a booster antenna disposed inside the internal area of the metal frame. The "open loop" metal frame may comprise a slit or gap which may extend from an inner edge to an outer edge of the metal frame, and the booster antenna disposed inside the internal area of the metal frame. The gap may provide a means for tuning the resonant frequency of the booster antenna. Insulating layers may be disposed on at least one side of the metal frame, covering the slit, and may comprise a dielectric medium such as an oxide layer. Additional details regarding the discontinuous metal frame are described in U.S. Pat. Pub. No. 2015/0269477, entitled "Dual-Interface Hybrid Metal Smartcard With a Booster Antenna or Coupling Frame," published Sep. 24, 2015, hereby incorporated by reference herein.

Eddy Currents: Induced electrical currents that flow in a circular path. In other words, eddy currents are closed loops of induced current circulating in planes perpendicular to the magnetic flux. Eddy currents concentrate near the surface adjacent to the excitation coil of the contactless reader generating the electromagnetic field, and their strength decreases with distance from the transmitter coil. Eddy current density decreases exponentially with depth. This phenomenon may be referred to as the skin effect. The depth that eddy currents penetrate into a metal object is affected by the frequency of the excitation current and the electrical conductivity and magnetic permeability of the metal.

Eddy Currents' Relationship with a Slit in a Metal Layer or Metal card Body: A discontinuity interrupts or alters the amplitude and pattern of the eddy currents which result from the induced electromagnetic field generated by a contactless point of sale terminal. The eddy current density is highest near the surface of the metal layer and decreases exponentially with depth.

Laser Personalization: An RFID-enabled smartcard may comprise a metal layer having a scratch protection coating over a print layer on a front face, wherein the scratch protection coating may include at least one of a layer of ink, varnish or a polymer and, optionally, a layer of hard coat lamination film. The scratch protection coating is suitable for a variety of treatments. One such treatment includes the scratch protection coating capable of being laser marked for inscribing personalization data into or onto the coating. Another such treatment includes the scratch protection coating capable of being laser engraved to partially remove the coating to create a logo or a deboss feature. Yet another such treatment includes the scratch protection coating capable of being laser treated without removal of material to create thin film effects.

Metal Edge & Metal Ledge Overlap: For optimum RF performance, the dimensional width of the windings (or width across multiple windings) of a sense coil, patch antenna or a pick-up coil may overlap a metal edge by approximately, and more particularly 50%, to capture the surface currents. The same may apply to the module antenna of a transponder chip module implanted in a metal containing transaction card. The dimensional width of the windings of the module antenna may overlap a metal ledge of a stepped cavity forming the module pocket in a card body by approximately 50%, and more particularly 50%. In the case of an antenna probe, surface currents are collected between very close metal edges. As the shape and form of the antennas may change, the dimensional width of the windings may be replaced by the surface area or volume.

Module Antenna: An antenna structure located on the face-down-side of a transponder chip module or dual interface chip module for inductive coupling with an in-card booster antenna or coupling frame. The antenna structure may be rectangular in shape with dimensions confined to the size of the module package having 6 or 8 contact pads on the face-up-side. The termination ends of the antenna structure with multiple windings (e.g., 13 to 15 turns) based on a frequency of interest (e.g., 13.56 MHz) may be bonded to the connection pads on the RFID chip. In the case of a coupling frame smartcard such as a dual interface metal core transaction card, the module antenna may overlap the coupling frame and/or metal layer(s) within the card body at the area of the module opening to accept the transponder chip module.

Polyester Adhesive System: Unsaturated (thermosetting) polyesters have a catalytic cure and may be used as an adhesive in the application of bonding polyester substrates (PET or PEN) or laminates and for bonding polyester to metal.

RFID Slit Technology: Modifying a metal layer or a metal card body into a so-called "antenna circuit" by providing a discontinuity in the form of a slit, slot or gap in the metal layer or metal card body which extends from a peripheral edge to an inner area or opening of the layer or card body. The concentration of surface current at the inner area or opening can be picked up by another antenna (e.g., a module antenna) or antenna circuit by means of inductive coupling which can drive an electronic circuit such as an RFID chip attached directly or indirectly thereto. The slit may be ultra-fine (e.g., less than 50 μm or less than 100 μm), cut entirely through the metal with an IR laser, with the debris from the plume removed by ultrasonic or plasma cleaning. Without a cleaning step after lasing, the contamination may lead to shorting across the slit. In addition, the slit may be filled with a dielectric to avoid such shorting during flexing of the metal forming the transaction card. The laser-cut slit may be further reinforced with the same filler such as a resin, epoxy, mold material, repair liquid or sealant applied and allowed to cure to a hardened state or flexible state. The filler may be dispensed, cast, or injection molded. The term "slit technology" may also refer to a "coupling frame" with the aforementioned slit, or to a smartcard embodying the slit technology or having a coupling frame incorporated therein.

Sense Coil, Patch Antenna and Pick-up Coil: Types of coils or antennas used to capture surface current by means of inductive coupling at the edge of a metal layer or metal card body or around a discontinuity in a metal layer or metal card body when such conductive surfaces are exposed to an electromagnetic field. The coils or antennas may be wire wound, plated, chemically etched or laser etched, and positioned at very close proximity to a discontinuity in a metal layer, at the interface between a conductive and non-conductive surface, or at the edge of a metal layer.

Skin Depth: Level in a conductor to which electric current flows. Skin effect is the tendency of an alternating electric current to become distributed within a conductor such that the current density is largest near the surface of the conductor, and decreases with greater depths in the conductor. The electric current flows mainly at the "skin" of the conductor, between the outer surface and the skin depth. The skin effect causes the effective resistance of the conductor to increase at higher frequencies where the skin depth is smaller, thus reducing the effective cross-section of the conductor. The skin effect is due to opposing eddy currents induced by the changing magnetic field resulting from the alternating current.

I. Overview

The following describes various examples of a transaction card, which may also be referred to as "cards" or "smartcards," such as a metal transaction card and, more particularly, an RFID-enabled transaction card having at least contactless capability, including dual interface (contactless and contact) transaction cards, including cards having a metal layer in a stack-up arrangement of a card body. In one or more examples, such card bodies may be substantially, or even entirely, formed of metal (i.e., a metal card body).

In one example, an RFID-enabled metal transaction card has a metal inlay forming a metal card body, and various stack-up arrangements. One or more examples of transaction cards described herein may be "one-sided", in that they may only operate in contactless mode when a rear side of the transaction card is presented to an external reader, such as a contactless point of sale ("POS") terminal. A front side of the transaction card may have a continuous metal layer, without a slit as discussed below in greater detail, but with a shielding layer and an amplifying element disposed behind a front metal layer to enable contactless functionality when the rear side of the transaction card is presented to the external reader. In this respect, any device external of a transaction card and capable of communicating information to or from the transaction card may generally be referred to as an external reader.

In one example, an RFID-enabled metal transaction card has a front metal layer without a slit accompanied by a rear synthetic layer operating in contactless mode from a rear side of a card body with an activation distance greater than (or at least) approximately 4 cm and having drop acoustics which sound like metal.

In one example, an RFID-enabled metal transaction card includes an edge-to-edge metal layer within a rear layer of a card body with an opening and a slit to function as a coupling frame, while also providing enhanced rigidity to the card construction. Such RFID-enabled metal transaction card may be further configured to harvest energy from the rear metal layer being discontinuous via the slit, which thus forms a one turn antenna, and inductively couples either to a perimeter coil or a coupler coil of a booster antenna circuit without the coupling directly to a module antenna of a transponder chip module.

In one example, an RFID-enabled metal transaction is configured to provide contactless communication from a front face continuous metal layer by a separation channel between a metal edge of a module opening and a module antenna of a transponder chip module.

The above overview of one or more examples of a metal transaction card includes a variety of features which may be incorporated in whole or in part into a metal transaction card for EMV payment transactions. One or more aspects of these features will be discussed below in the context of examples of metal transaction cards (10, 110, 210, 310, 410, 610, 710, 810) with exemplary inductive coupling arrangements (29, 129, 329, 429, 629, 729, 829). It will be appreciated that these features may be incorporated into a metal transaction card in various combinations and/or in accordance with the above overview such that the invention is not intended to be unnecessarily limited to any particular example shown and described herein.

II. RFID Enabled Metal Transaction Cards with Various Inductive Coupling Arrangements In some instances, an RFID enabled metal transaction card may include a metal transaction card body having a continuous front metal layer, a discontinuous rear metal layer with a discontinuity, such as a slit, extending therethrough, and a chip opening extending through each of front and rear metal layers. In addition, an RFID enabled metal transaction card such as those discussed below further includes an inductive coupling arrangement with a coupler coil disposed between the front and rear metal layers that is configured to inductively couple with the rear metal layer for harvesting energy from an electromagnetic field. The following will address one or more features associated with an RFID enabled metal transaction card for improved performance associated with such harvesting of energy, such as for EMV payment transactions. As used herein, the term "continuous" with respect to a metal layer means that this particular metal layer does not include one or more discontinuities, such as one or more slits, and is thus continuous, even if such continuous metal layer has at least a portion of a chip opening extending therethrough. As used herein, the term "discontinuous" with respect to a metal layer means that this particular metal layer includes one or more discontinuities, such as one or more slits, and is thus discontinuous.

A. Various Coupling Arrangements of Discontinuous Metal Layer to Perimeter Coil

Figure 2:
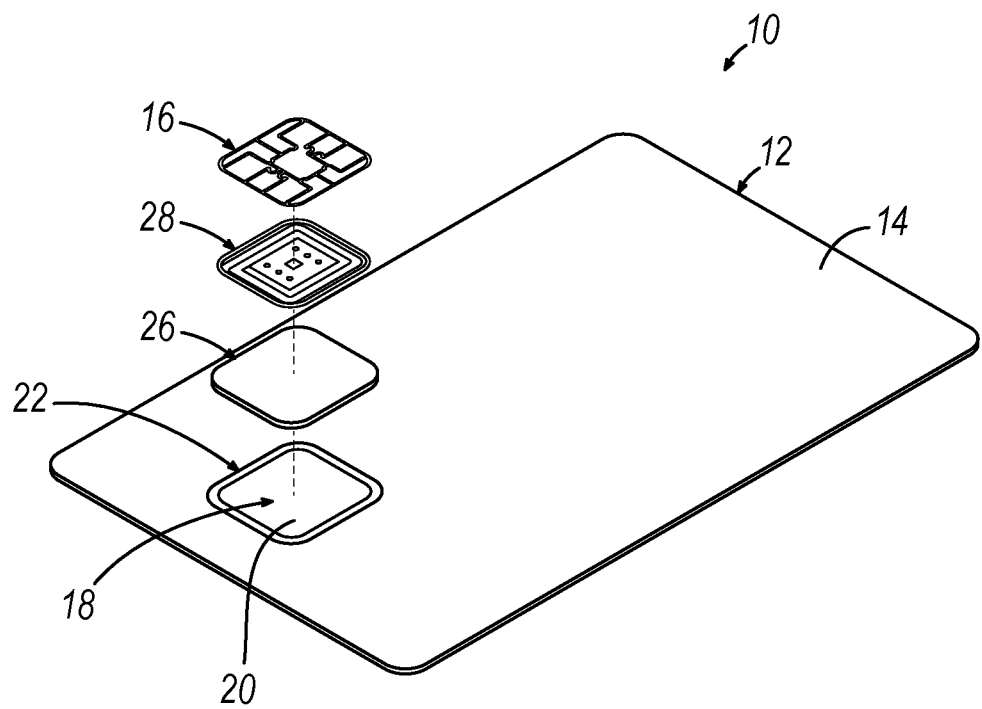
FIG. 2 depicts a partially disassembled front perspective view of the metal transaction card of FIG. 1.

With respect to FIGS. 1-2, a first example of a metal transaction card (10) is dual interface and includes a card body (12) with a front metal layer (14) that is more particularly a front face metal layer (14) and is continuous, a transponder chip module (16), and a chip opening (18). Chip opening (18) of the present example more particularly includes a front chip hole (20) extending through front metal layer (14) to define a front metal edge (22) surrounding front chip hole (20). Front chip hole (20) is generally oversized relative to transponder chip module (16) received therein to define a separation channel (24) laterally between transponder chip module (16) and front metal edge (22). In this respect, separation channel (24) is configured to permit radio frequency reception and transmission therethrough from front face metal layer (14).

In addition to separation channel (24), metal transaction card (10) further includes a slug (26) received in chip opening (18), whereas transponder chip module (16) has a module antenna (28). Slug (26) is configured to accept insertion, which may also be referred to as implantation, of transponder chip module (16) for the purpose of further forming separation channel (24) more particularly between module antenna (28) and metal edge (22) of chip opening (18) in card body (12).

In this respect, chip opening (18) in front face metal layer (14) thus receives slug (26), which may be a synthetic insert, laminate, thermosetting resin (e.g., polyurethane), polymeric material, plastic, and/or like insulative, non-conductive material slug (26) to cover this area of chip opening (18). By way of example, such insulative, non-conductive material may be transparent, translucent or pigmented with color. By way of further example, such insulative, non-conductive material may allow the transmission of light therethrough, such as from a light emitting diode (LED), and the passage of radio waves. Chip opening (18) has a predetermined shape and may be rectangular, round, or elliptical and may, in one or more examples, differ from a shape of module antenna (28) of transponder chip module (16).

Figure 3:
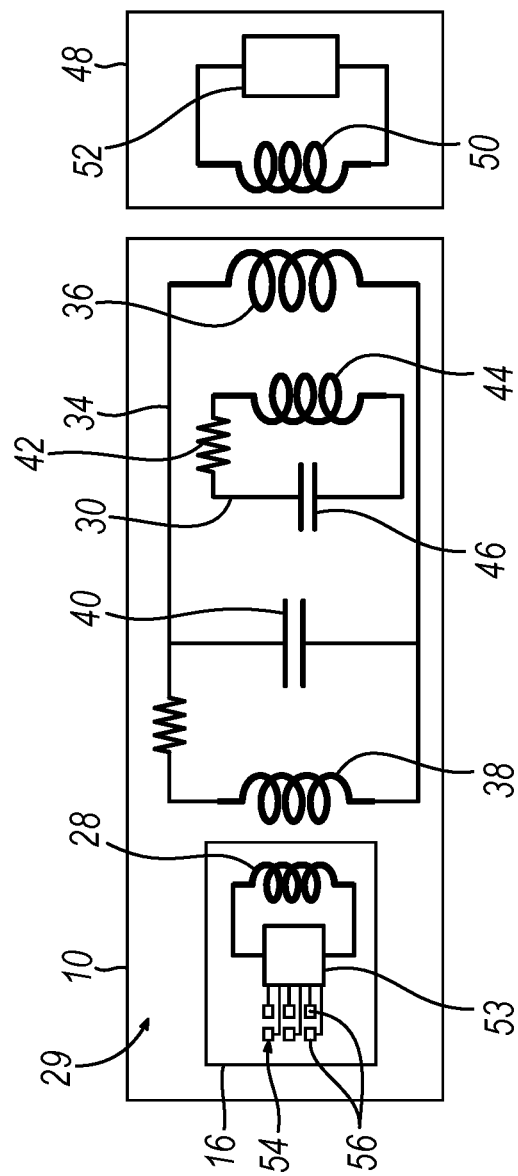
FIG. 3 depicts a schematic view of the metal transaction card of FIG. 1 with a first exemplary inductive coupling arrangement incorporated therein.

FIG. 3 shows a first exemplary inductive coupling arrangement (29) incorporated into metal transaction card (10) of the present example. Inductive coupling arrangement (29) includes a rear metal layer (30) of card body (12) having a discontinuity, such as a slit (32) (see FIG. 4) in the present example. Inductive coupling arrangement (29) also includes a booster antenna circuit (34) having a perimeter coil (36), a coupler coil (38), and a capacitor bank (40) and may be arranged such that either one of perimeter coil (36) or coupler coil (38) is configured to inductively couple with discontinuous rear metal layer (30). More specifically, in the present example, perimeter coil (36) includes a predetermined number of windings, coupler coil (38) includes a predetermined number of windings, and capacitor bank (40) connects in parallel with coupler coil (38) for frequency trimming. In turn, perimeter coil (36) inductively couples with discontinuous rear metal layer (30), which, with slit (32) (see FIG. 4), effectively performs as a one turn resistor (42), inductor (44), and capacitor (46) circuit.

Metal transaction card (10) is configured to inductively couple to a contactless point of sale terminal (48), which has a POS communication coil (50) for transmission and/or reception and a radio frequency (RF) transmitter (52). POS communication coil (50) thus acts as an electromagnetic coupler for supplying power to, and exchanging information with, transponder chip module (16) by contactless communication. By way of example, perimeter coil (36) has the predetermined number of windings defining approximately twelve turns, coupler coil (38) has the predetermined number of windings defining approximately ten turns, and coupler coil (38) inductively couples with module antenna (28), which has a predetermined number of windings, which define approximately twelve to approximately twenty-four turns. Of course, alternative windings may define alternative numbers of turns such that the invention is not intended to be unnecessarily limited to these particular predetermined turns. In addition to module antenna (28) for contactless communication, transponder chip module (16) further includes an identification chip (53), which may also be referred to in the present example as a payment chip (53), a contact interface (54), which, in one present example, has six contact pads (56) and, in another example has eight contact pads (56).

Although capacitor bank (40) is connected in parallel to coupler coil (38) so as to form a parallel resonance circuit in the present example, capacitor bank (40) may alternatively be connected in series between coupler coil (38) and perimeter coil (36). In one example, capacitor bank (40) may be removed entirely from inductive coupling arrangement (29) in the event that parasitic capacity may be increased with an alternative number of predetermined windings with differing turns. In still another example, capacitor bank (40) could be replaced by an electronic device, such as a light emitting diode (LED) with a rectifier.

Figure 4:
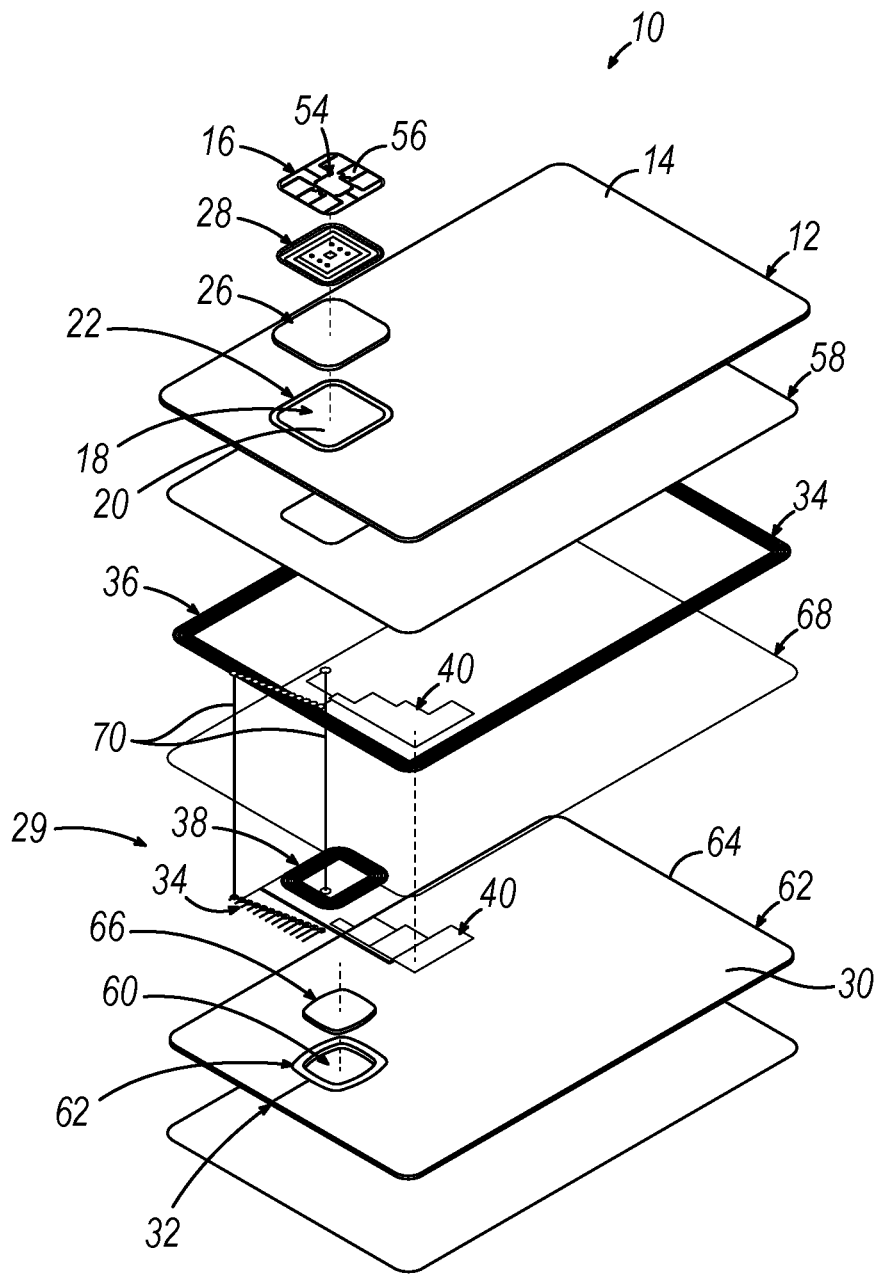
FIG. 4 depicts a disassembled front perspective view of the metal transaction card of FIG. 1 with the inductive coupling arrangement of FIG. 3.

FIG. 4 shows stack-up arrangement of metal transaction card (10) with inductive coupling arrangement (29) incorporated therein to operate with dual interface, including contactless mode from both sides of card body (12). As discussed above, plastic slug (26) is implanted in chip opening (18) and receives transponder chip module (16). Booster antenna circuit (34) is mounted on a magnetic shielding layer (58) via a thermosetting adhesive layer (not shown), with each sandwiched between continuous front face metal layer (14) and discontinuous rear metal layer (30). In this respect, slit (32) transversely extends entirely through rear metal layer (30) from a front face to a rear face thereof. Chip opening (18) of the present example more particularly includes a rear chip hole (60) extending through rear metal layer (30) to define a rear metal edge (62) surrounding rear chip hole (60). Slit (32) laterally extends from an outer peripheral edge (64) of rear metal layer (30) through to rear metal ledge (62) such that rear metal layer (30) functions as a coupling frame for contactless communication.

Plastic slug (26) receives transponder chip module (16) with module antenna (28) simultaneously inductively coupled with each of coupler coil (38) of booster antenna circuit (34) and coupler coil (38) overlapping rear metal ledge (62) of chip opening (18) in rear metal layer (30). In the present example, module antenna (28), coupler coil (38), and metal ledge (62) are generally concentrically positioned in chip opening (18). After embedding transponder chip module (16) into plastic slug (26), which is in chip opening (18), separation channel (24) is formed laterally between module antenna (28) and metal edge (22) in continuous front metal layer (14). Separation channel (24) in front metal layer (14) surrounds module antenna (28) laterally between module antenna (28) and metal edge (22) and is configured to permit radio frequency reception and transmission therethrough for contactless communication from the area around transponder chip module (16). The following will address exemplary layers and/or features for metal transaction card (10) with continuous front metal layer (14) without a discontinuity, such as a slit, and discontinuous rear metal layer (30) having a discontinuity, such as slit (32).

Transponder chip module (16) has a front portion with an arrangement of contact pads (56) and a rear portion with module antenna (28).

Module antenna (28) with a predetermined shape and a predetermined number of windings, which define approximately twelve to approximately twenty-four turns in the present example. Such predetermined number of windings may be selected and incorporated into module antenna (28) based on input capacitance of an RFID chip, track width, and/or track spacing.

Chip opening (18) of a predetermined shape with metal edge (22) surrounds front chip hole (20) in front metal layer (14) without a slit, and metal ledge (62) surrounds rear chip hole (60) in rear metal layer (30) with slit (32).

Metal edge (22) surrounds a plastic slug (26) having a matching color to any one or more portions of card graphics. Plastic slug (26) is configured to receive transponder chip module (16) such that plastic slug (26) mechanically supports transponder chip module (16) and may be attached thereto via an adhesive tape (not shown).

Color matching plastic slug (26) fills voids in front chip hole (20) of chip opening (18) in front metal layer (20), whereas another plastic slug (66) fills voids in rear chip hole (60) of chip opening (18) in rear metal layer (30). Color matching plastic slug (26) and plastic slug (66) may be replaced in one or more examples by a layer of thermosetting resin (e.g. polyurethane) cast to a backside of front metal layer (20) and rear metal layer (30), coating metal layers (20, 30) with resin while at the also filling any voids and discontinuities in metal layers (20, 30).

Separation channel (24) extends between metal edge (22) and module antenna (28) after implanting of transponder chip module (16) into plastic slug (26).

Front metal layer (20) without a slit, which is thus continuous, may have a print (ink and primer) and a protective coating layer disposed thereon such that the primer may be a two-component screen printing ink.

High permeability magnetic sheet shielding layer (58) includes a void and has a predetermined thickness, such as approximately 50 μm, approximately 65 μm, approximately 75 μm or approximately 100 μm. Magnetic sheet shielding layer (58) may include calcium carbonate (CaCO₃), silicon dioxide (SiO₂), magnesium fluoride (MgF₂), SiO2, chromium (Cr) and/or iron (Fe), to offset the effects of electromagnetic shielding caused by front metal layer (20). In addition, magnetic sheet shielding layer further has booster antenna circuit (34) assembled to a rear face thereof by a thermosetting adhesive layer (not shown).

Booster antenna circuit (34) may be chemically etched, plated copper tracks, conductive printed tracks, wire embedding, or electrically conductive formation attached to high permeability magnetic shielding layer (58), which may be a low magnetic loss ferrite or a non-ferrite layer, by an adhesive layer as discussed briefly above. Booster antenna circuit (34) more particularly includes perimeter coil (36), coupler coil (38), and a set of parallel plate trimming capacitors also referred to above as capacitor bank (40). Booster antenna circuit (34) may be assembled on a PET carrier layer (68) with a void having a top antenna layer, such as perimeter coil (36). Perimeter coil (36) of the present example has approximately twelve windings, including a copper track width of approximately 150 μm, spacing between tracks of approximately 100 μm, and a copper track thickness of approximately 12 to approximately 35 μm for a total width of perimeter coil of approximately 2.9 mm. Booster antenna circuit (34) of the present example further includes vertical interconnects (70) connecting upper capacitor plate electrodes of capacitor bank (40) with perimeter coil (36) facing magnetic shielding layer (58). In addition, booster antenna circuit (34) also has coupler coil (38), which may also be referred to as a bottom antenna layer, with approximately nine windings, including a copper track width of approximately 250 μm, spacing between tracks of approximately 100 μm, and a copper track thickness of approximately 12 to approximately 35 μm for a total width of coupler coil (38) of approximately 3.05 mm. Lower capacitor plate electrodes of capacitor bank (40) with coupler coil (38) face discontinuous rear metal layer (30) acting as a coupling frame.

Perimeter coil (36) has a predetermined number of windings including turns spanning a width within a narrow region positioned close to discontinuous rear metal layer (30). In one example these predetermined number windings of perimeter coil (36) are positioned as close as reasonably possible to edges of rear metal layer (30) for improved, such as optimal, RF performance. In one example, such a distance of these predetermined number windings of perimeter coil (36) to edges of rear metal layer (30) is approximately 1 mm or less than approximately 1 mm. Generally, RF performance tends to decay rapidly with increasing distance of perimeter coil (36) from the edge of rear metal layer (30).

Coverage of module antenna (28) overlapping on a footprint of coupler coil (38) in one example is approximately 100% overlap, and more particularly 100% overlap, whereas coverage of coupler coil (38) overlapping metal ledge (62) of chip opening (18) in one example is approximately 50% overlap, and more particularly 50% overlap. Such overlaps are merely exemplary and not intended to unnecessarily limit the invention described herein. In addition, the arrangement of perimeter coil (36) and coupler coil (38) on PET carrier layer (68) are respectively positioned on a top surface and bottom surface thereof in one example, but may be interchanged or portions of their respective antenna structures may be located on both sides of the carrier layer (68) in one or more examples.

Rear metal layer (30) receives a laminate layer of printing and security elements for use.

While the above stack-up arrangement provides one example of metal transaction card (10), it will be appreciated that these features and/or dimensions may vary such that the invention is not intended to be unnecessarily limited to the above stack-up arrangement of metal transaction card (10).

Figure 5:
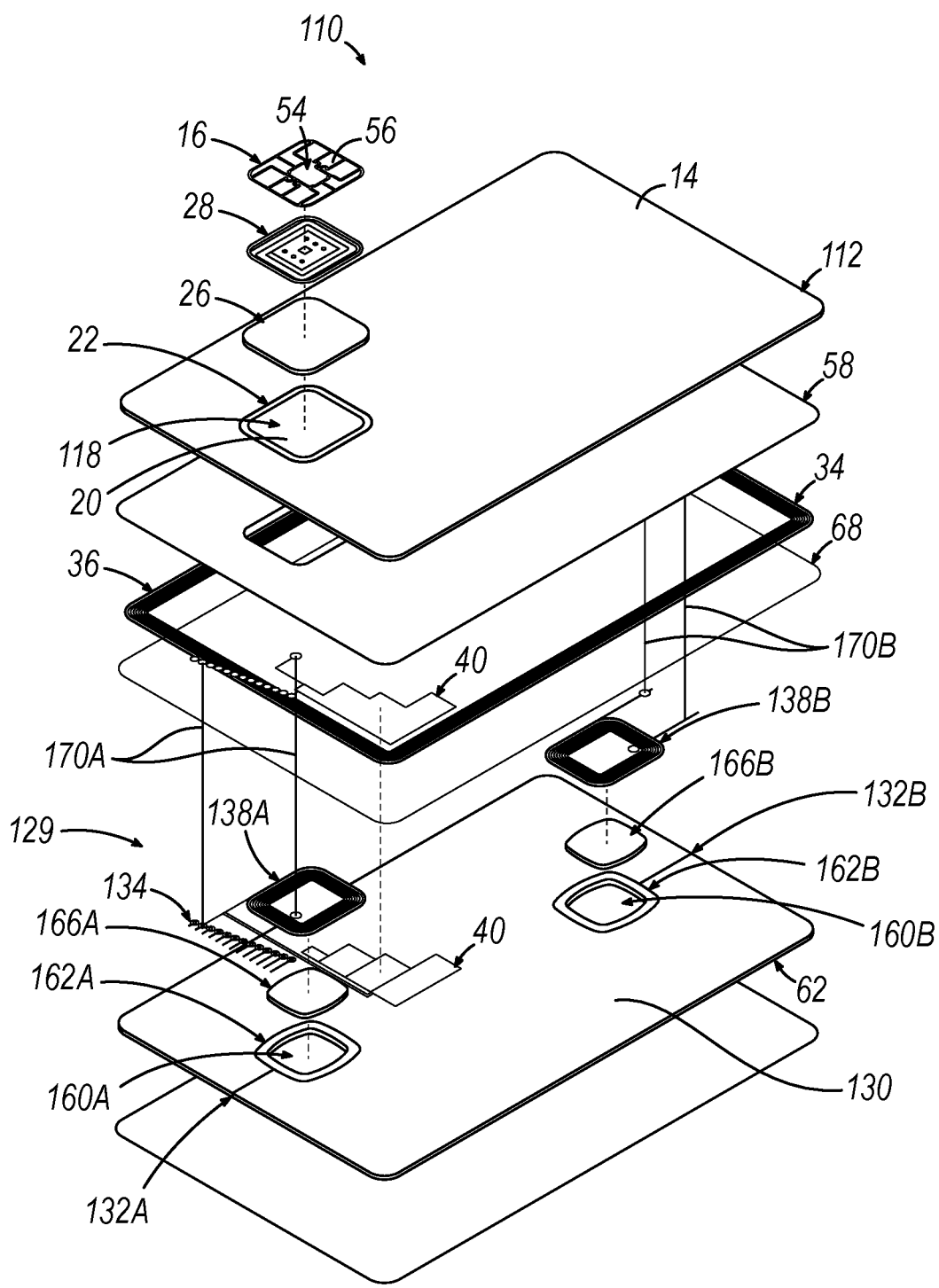
FIG. 5 depicts a disassembled front perspective view of a second example of a metal transaction card with a second inductive coupling arrangement.

FIG. 5 shows a second example of a metal transaction card (110) with a second exemplary inductive coupling arrangement (129) incorporated therein to operate with dual interface, including contactless mode from both sides of a card body (112). Metal transaction card (110) and inductive coupling arrangement (129) are respectively similar to metal transaction card (10) (see FIG. 4) and inductive coupling arrangement (29) (see FIG. 4) unless otherwise stated herein with like numbers below indicating like features discussed above in greater detail. To this end, a booster antenna circuit (134) of inductive coupling arrangement (128) is mounted on magnetic shielding layer (58). A Chip opening (118) includes front chip hole (20) in front metal layer (14) and receives plastic slug (26). Chip opening (118) further includes a left rear chip hole (160A) and a right chip hole in rear metal layer (30) with each of such left and right chip holes (160A, 160B) receiving left and right plastic slugs (166A, 166B). Chip opening (118) may thus include various such holes (20, 160A, 160B) in the present example.

Transponder chip module (16) is embedded in plastic slug (26) and mechanically supported thereon. After receipt of transponder chip module (16) in plastic slug (26), separation channel (24) is defined between module antenna (28) and front metal edge (22) as discussed above. In one example, separation channel (24) surrounds transponder chip module (16), follows a contour and a shape of module opening (118), and may have a width of greater than or equal to approximately 250 μm.

A rear metal layer (130) is discontinuous with a left slit (132A) extending from outer peripheral edge (64) into left rear chip hole (160A) through a left metal ledge (162A) as well as a right slit (132B) extending from outer peripheral edge (64) into right rear chip hole (160B) through a right metal ledge (162B). Rear metal layer (130) is thereby configured to function as a coupling frame for contactless communication. Chip holes (160A, 160B), metal ledges (162A, 162B), and slits (132A, 132B) are more particularly configured to concentrate surface currents in the presence of a electromagnetic field, such as that of an external reader. Booster antenna circuit (134) further includes left and right coupler coils (138A, 138B) configured to harvest energy through inductive coupling with rear metal layer (130) to inductively power transponder chip module (16) via module antenna (28) or any other electronic component or device within card body (112) if applicable. In the present example, left and right coupler coils (138A, 138B) are operatively connected to capacitor bank (40) by left and right vertical interconnects (170A, (170B) such that left and right coupler coils (138A, 138B) are generally connected in parallel.

While the above stack-up arrangement provides one example of metal transaction card (110), it will be appreciated that these features and/or dimensions may vary such that the invention is not intended to be unnecessarily limited to the above stack-up arrangement of metal transaction card (110).

Figure 6:
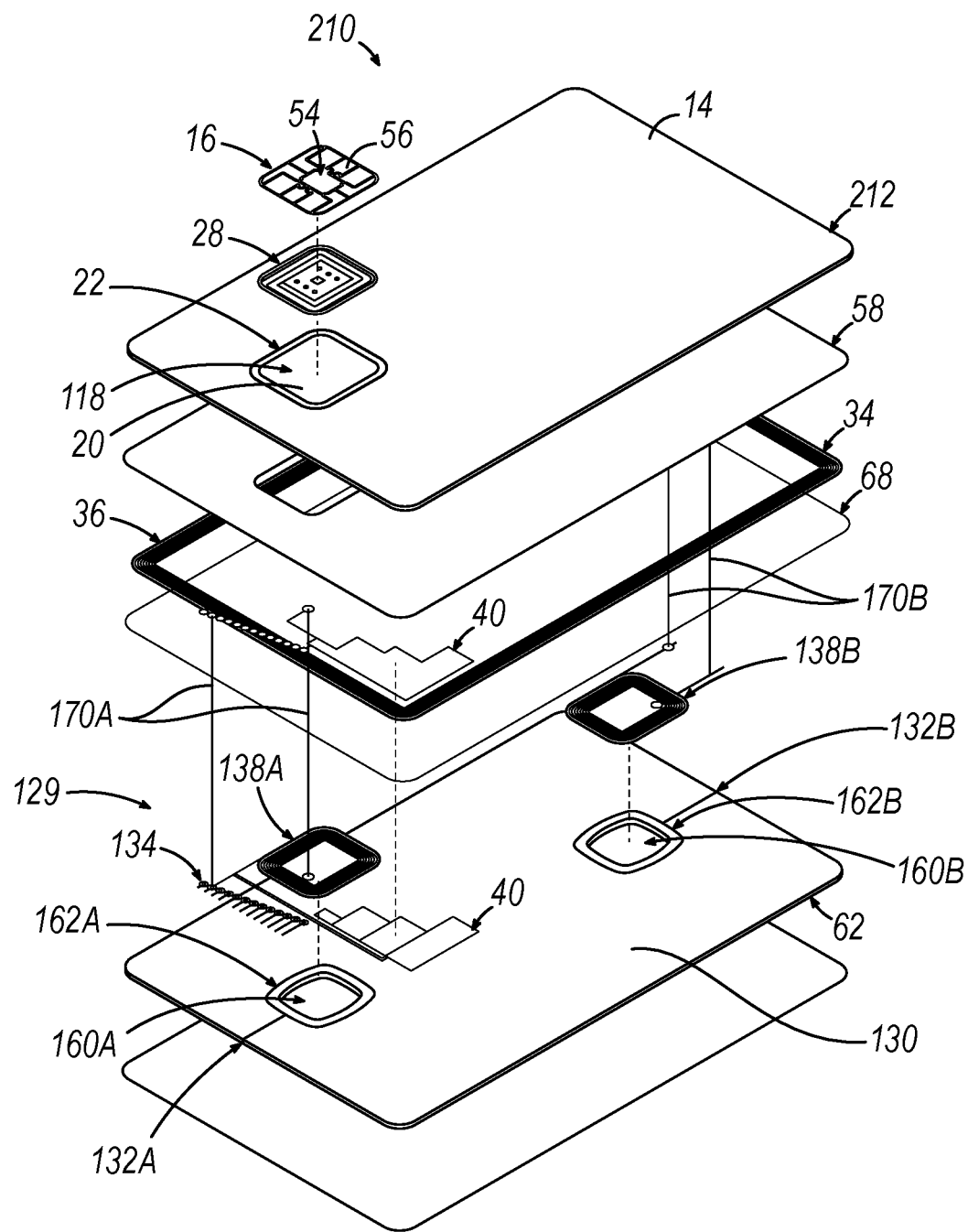
FIG. 6 depicts a disassembled front perspective view of a third example of a metal transaction card with the inductive coupling arrangement of FIG. 5.

FIG. 6 shows a third example of a metal transaction card (210) with inductive coupling arrangement (129) incorporated therein to operate with dual interface, including contactless mode from both sides of a card body (212). Metal transaction card (210) and inductive coupling arrangement (129) are respectively similar to metal transaction cards (10, 110) (see FIG. 4 and FIG. 5) and inductive coupling arrangements (29) (see FIG. 4 and FIG. 5) unless otherwise stated herein with like numbers below indicating like features discussed above in greater detail. More particularly, metal transaction card (210) is like metal transaction card (110), but does not include plastic slugs (26, 166A, 166B). While this stack-up arrangement provides one example of metal transaction card (210), it will be appreciated that these features and/or dimensions may vary such that the invention is not intended to be unnecessarily limited to the above stack-up arrangement of metal transaction card (210).

Figure 7:
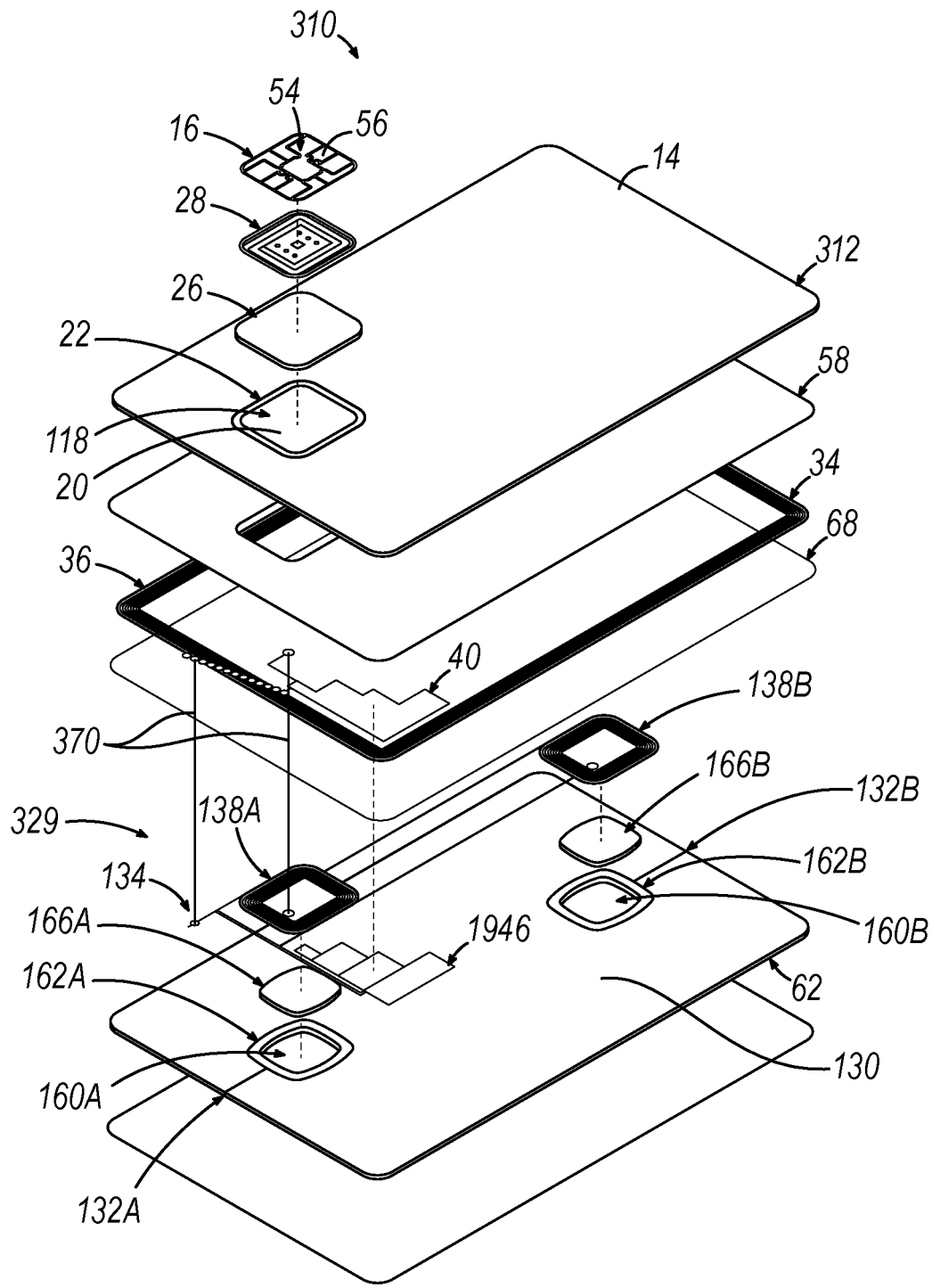
FIG. 7 depicts a disassembled front perspective view of a fourth example of a metal transaction card with a third exemplary inductive coupling arrangement.

FIG. 7 shows a fourth example of a metal transaction card (310) with a third exemplary inductive coupling arrangement (329) incorporated therein to operate with dual interface, including contactless mode from both sides of card body (112). Metal transaction card (310) and inductive coupling arrangement (329) are respectively similar to metal transaction cards (10, 110, 210) (see FIG. 4, FIG. 5, and FIG. 6) and inductive coupling arrangements (29, 129) (see FIG. 4 and FIG. 5) unless otherwise stated herein with like numbers below indicating like features discussed above in greater detail. More particularly, metal transaction card (310) is like metal transaction card (110), but with left and right coupler coils (138A, 138B) operatively connected to capacitor bank (40) by interconnects (370) such that left and right coupler coils (138A, 138B) are generally connected in series. Right coupler coil (138B) collects energy from a right side of card body (112) and is transferred directly to left coupler coil (138A) to thus function like an extension antenna for left coupler coil (138A). While this stack-up arrangement provides one example of metal transaction card (310), it will be appreciated that these features and/or dimensions may vary such that the invention is not intended to be unnecessarily limited to the above stack-up arrangement of metal transaction card (310).

Figure 8:
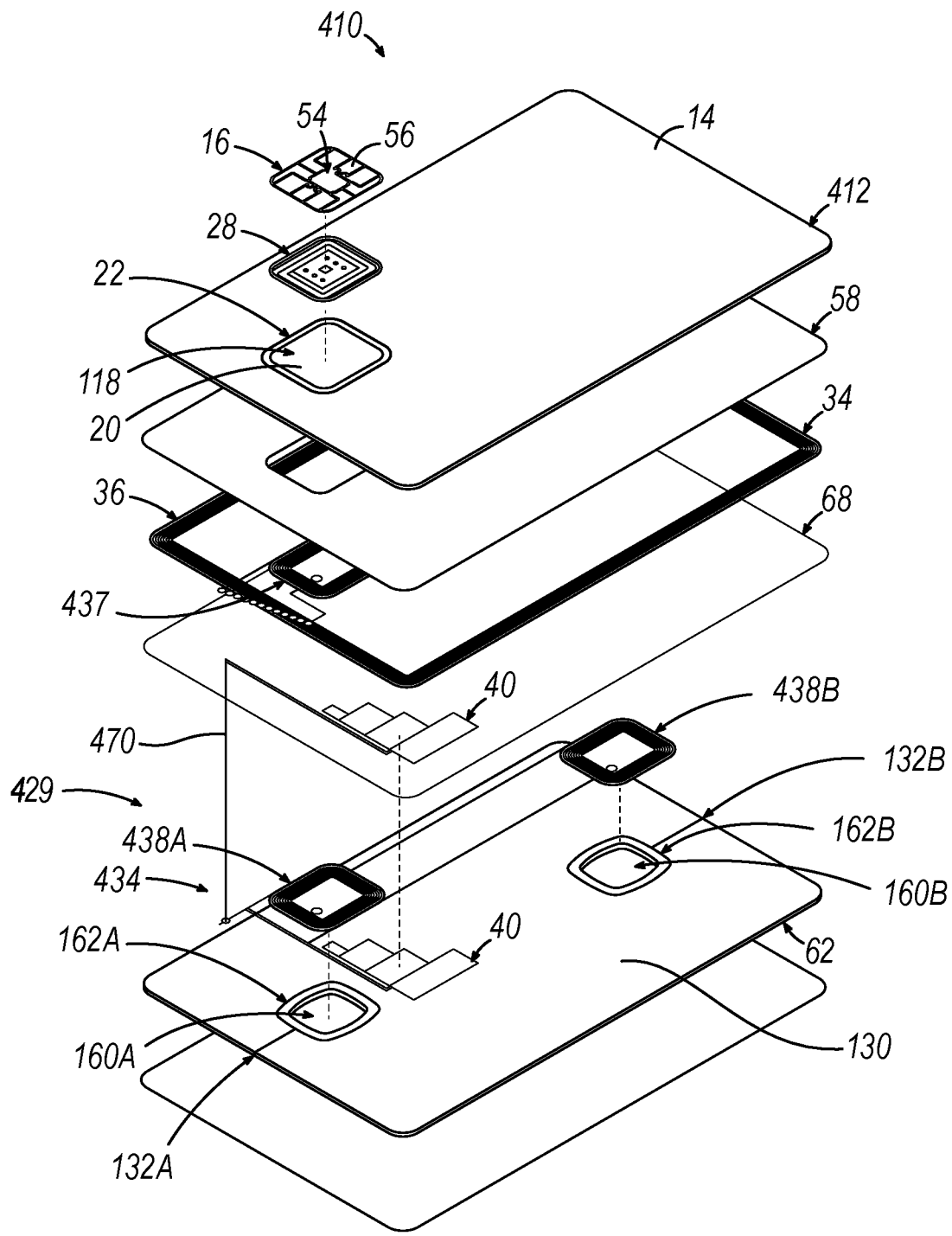
FIG. 8 depicts a disassembled front perspective view of a fifth example of a metal transaction card with a fourth inductive coupling arrangement.

FIG. 8 show a fifth example of a metal transaction card (410) with a fourth exemplary inductive coupling arrangement (429) incorporated therein to operate with dual interface, including contactless mode from both sides of a card body (412). Metal transaction card (410) and inductive coupling arrangement (429) are respectively similar to metal transaction cards (10, 110, 210, 310) (see FIG. 4, FIG. 5, FIG. 6, and FIG. 7) and inductive coupling arrangements (29, 129, 329) (see FIG. 4, FIG. 5, and FIG. 7) unless otherwise stated herein with like numbers below indicating like features discussed above in greater detail. More particularly, inductive coupling arrangement (429) includes a booster antenna circuit (434) including perimeter coil (36) connected to an upper coupler coil (437), which is positioned over left rear chip hole (160A). In addition, inductive coupling arrangement (429) further includes left and right coupler coils (438A, 438B), neither one of which is physically connected to booster antenna circuit (434). Rather, left and right coupler coils (438A, 438B) are connected by interconnect (470) and together collect energy from rear metal layer (130). Left and right coupler coils (438A, 438B) are thus configured to inductively couple to upper coupler coil (437) via left coupler coil (438A). Left and right coupler coils (438A, 438B), which may also be referred to as twin coupler coils (438A, 438B), thus increase power into upper coupler coil (437). Furthermore, as this circuit of as twin coupler coils (438A, 438B) is physically separate from booster antenna circuit (434), additional electronics, such as a light emitting diode (LED), may be added with minimal effect on the RF properties of booster antenna circuit (434). While this stack-up arrangement provides one example of metal transaction card (410), it will be appreciated that these features and/or dimensions may vary such that the invention is not intended to be unnecessarily limited to the above stack-up arrangement of metal transaction card (410).

B. Various Coupling Arrangements of Discontinuous Metal Layer to Coupler Coil

Figure 9:
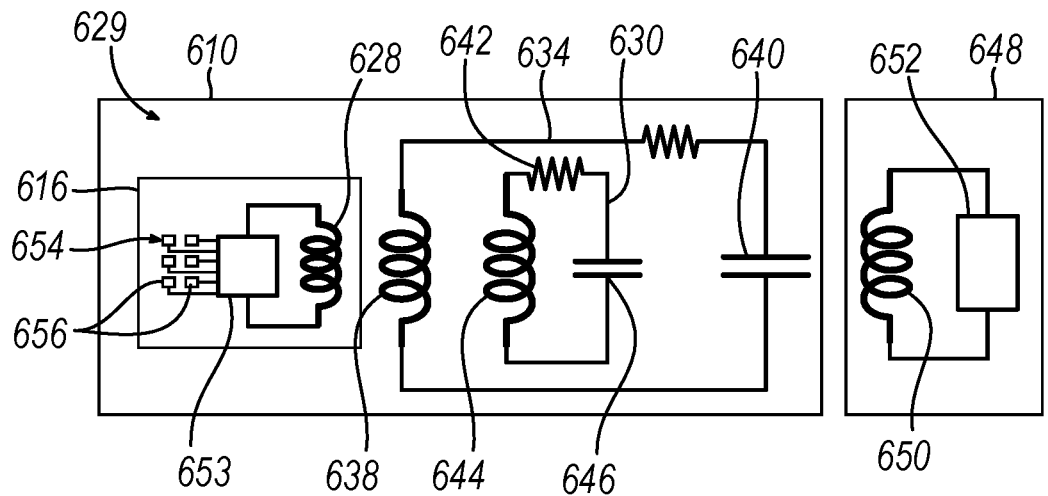
FIG. 9 depicts a schematic view of a sixth example of a metal transaction card with a fifth exemplary inductive coupling arrangement incorporated therein.

FIG. 9 shows a sixth example of a metal transaction card (610), such as an RFID enable metal transaction card, having a card body (612) (see FIG. 11) with a fifth exemplary inductive coupling arrangement (629) incorporated therein. Inductive coupling arrangement (629) of the present example includes a booster antenna circuit (634) including a coupler coil (638) with predetermined number of windings and a capacitor bank (640) connected in parallel with coupler coil (638) for frequency trimming. More particularly, coupler coil (638) is configured to inductively couple with a rear metal layer (630) having a discontinuity, such as a slit (632A) (see FIG. 11) extending therethrough. Rear metal layer (630) further includes a rear chip hole (660) (see FIG. 11) and a rear metal ledge (662) (see FIG. 11), which extends to edges thereof. Such slit (632A) (see FIG. 11), rear chip hole (660) (see FIG. 11), and rear metal ledge (662) (see FIG. 11) are collectively represented in FIG. 9 as a resistor (642), an inductor (644), and a capacitor (646), which may also be referred to as a one-turn RLC circuit. Notably, inductive coupling arrangement (629) does not include a perimeter coil, such as those discussed above, so that discontinuous rear metal layer (630) inductively couples via coupler coil (638) rather than a perimeter coil. In this respect, discontinuous rear metal layer (630) inductively couples directly with coupler coil (638) without other inductively coupled features therebetween.

To this end, metal transaction card (610) is configured to inductively couple to a contactless point of sale (POS) terminal (648) having a POS communication coil (650) for transmission and/or reception and a radio frequency (RF) transmitter (652). POS communication coil (650) thus acts as an electromagnetic coupler for supplying power to, and exchanging information with, a transponder chip module (616) by contactless communication. By way of example, coupler coil (638) has the predetermined number of windings defining approximately ten turns, and coupler coil (638) inductively couples with a module antenna (628) of transponder chip module (616), which has a predetermined number of windings, which define approximately twelve to approximately twenty-four turns. Of course, alternative windings may define alternative numbers of turns such that the invention is not intended to be unnecessarily limited to these particular predetermined turns. In addition to module antenna (628) for contactless communication, transponder chip module (616) further includes an identification chip (653), which may also be referred to in the present example as a payment chip (653), a contact interface (654), which, in one present example, has six contact pads (656) and, in another example has eight contact pads (656).

Figure 10:
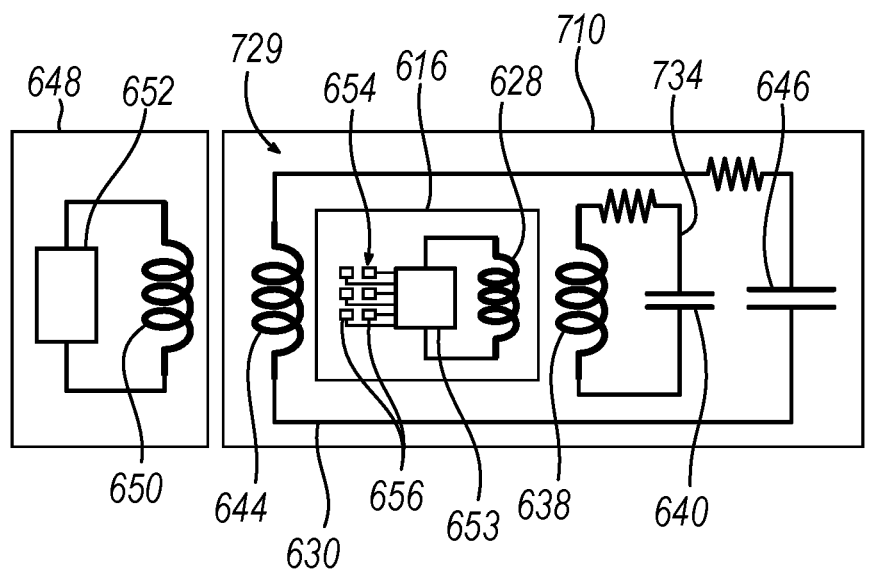
FIG. 10 depicts a schematic view of a seventh example of a metal transaction card with a sixth exemplary inductive coupling arrangement incorporated therein.

Alternatively, in a sixth exemplary inductive coupling arrangement (729) of a seventh example of a metal transaction card (710) shown in FIG. 10, another booster antenna circuit (734) includes coupler coil (638) and capacitor bank (640), which is merely optional. In this respect, inductive coupling arrangement (729) is similar to inductive coupling arrangement (629) unless otherwise stated herein with like numbers below indicating like features discussed above. Coupler coil (638) is configured to inductively couple with discontinuous rear metal layer (630). In addition, coupler coil (638) of booster antenna circuit (734) further inductively couples with module antenna (628) of a transponder chip module (616). In one example, booster antenna circuit (734) may further include of an extension antenna.

Figure 11:
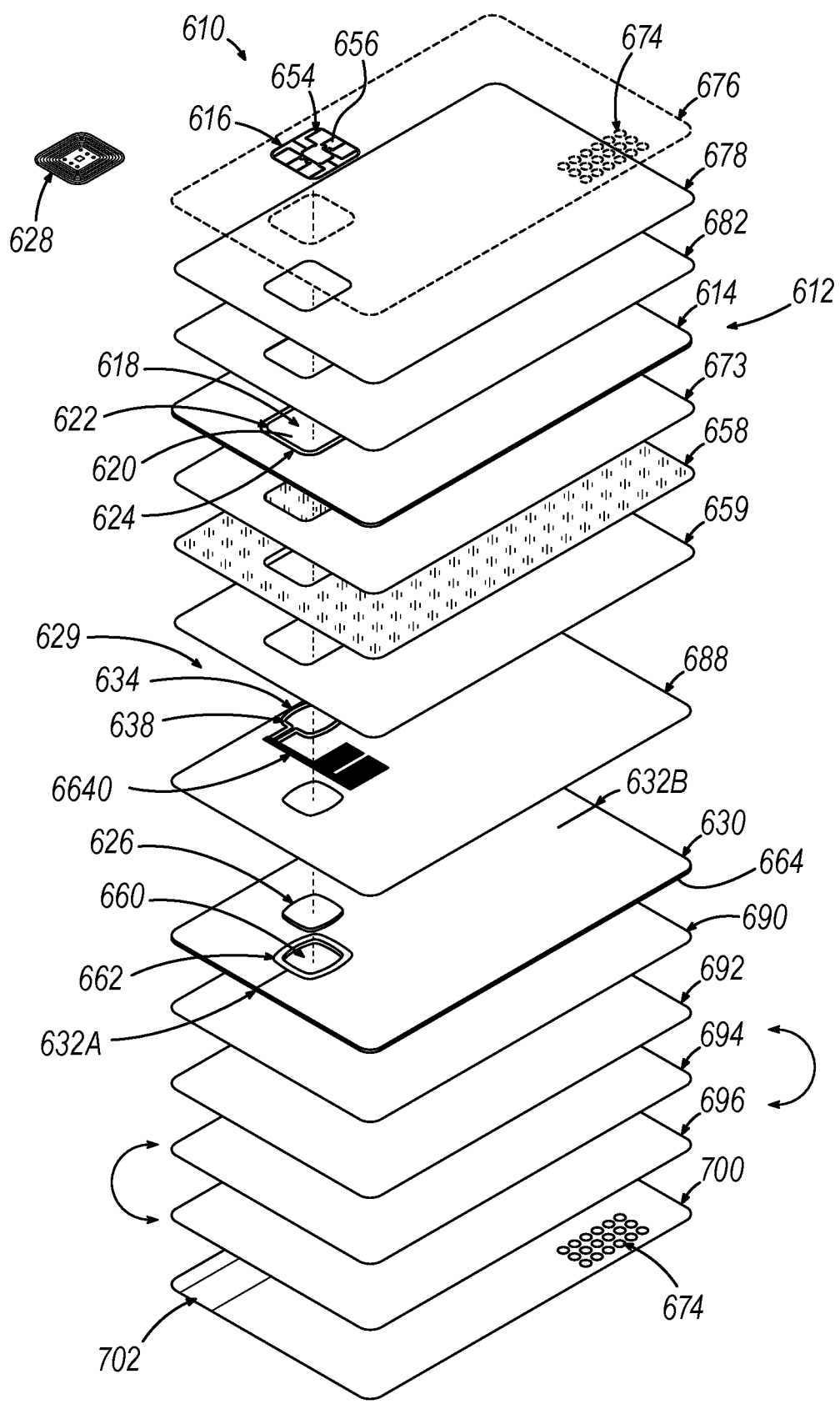
FIG. 11 depicts a disassembled front perspective view of the metal transaction card of FIG. 9 with the inductive coupling arrangement of FIG. 9.

FIG. 11 further shows card body (612) of metal transaction card (610) with inductive coupling arrangement (629) in greater detail. While the following describes card body (612) in the context of inductive coupling arrangement (629), in one or more examples, card body (612) may have inductive coupling arrangement (729) incorporated therein. Card body (612) is thus not intended to be unnecessarily limited to use with inductive coupling arrangement (629).

To this end, with respect to FIG. 11, metal transaction card (610) of the present example is dual interface with contactless tap-to-pay function from a front side and a rear side of card body (612) with booster antenna circuit (634) mounted on a magnetic shielding layer (658) via an adhesive layer (659), such as a thermosetting modified epoxy polyester adhesive film, with each sandwiched between a front metal layer (614), which is shown as a front face metal layer in the present example, and a rear metal layer (630). Generally, contactless communication range from the front side is more limited than the rear side of card body (612). By way of example, this contactless communication range from the front side may be approximately 4 cm from a center of transponder chip module (616). In one or more examples, the thermosetting modified epoxy polyester adhesive film may be replaced by a layer of thermosetting resin (e.g. polyurethane) with an adhesive coating in the form of a primer.

A chip opening (618) transversely extends through card body (612) and, more particularly, includes a front chip hole (620) transversely extending through front metal layer (614). Front metal layer (614) thus includes a front metal edge (622) surrounding front chip hole (620), which is configured to receive module antenna (628) of transponder chip module (616) therein. A separation channel (624) in the front metal layer (614) is defined between module antenna (628) and front metal edge (622) of front chip hole (620). Thereby, outermost windings of module antenna (628) of transponder chip module (616) are configured to receive contactless communication through separation channel (624) about transponder chip module (616).

In addition, discontinuous rear metal layer (630) acts as a coupling frame via slit (632A), which extends from an outer peripheral edge (664) of rear metal layer (630) through rear metal ledge (662) to rear chip hole (660). Active communication distance may be further increased in one or more examples by an additional slit (632B) in discontinuous rear metal layer (630). Such additional slit (632B) as shown in the present example laterally extends across tracks of an extended coupler coil (638) to receive surface currents from an electromagnetic field during use.

Chip opening (618) of the present example includes front chip hole (620) in front metal layer (614) as well as rear chip hole (660) in rear metal layer (630) such that each of front chip hole (620) and rear chip hole (660) receives portions of transponder chip module (616). Module antenna (628) thereby is configured to inductively couple with coupler coil (638) of booster antenna circuit (634). In turn, coupler coil (638) overlaps rear metal ledge (662) to edges thereof and slit (632A) in discontinuous rear metal layer (630). In the present example, module antenna (628), coupler coil (638), and metal ledge 662) of rear chip hole (660) are concentrically positioned relative to each other.

Transponder chip module (616) of the present example has contact pads (656) on a front, exposed surface thereof for contact communication with an external reader. Module antenna (628) is configured to inductively couple to coupler coil (638) of booster antenna circuit (634), which in turn inductively couples to discontinuous rear metal layer (630) to provide for contactless communication with an external reader. While transponder chip module (616) of the present example has dual interface capability with contact and contactless communication, an alternative example of such transponder chip module (616) has at least contactless capability. The present example of metal transaction card (612) further includes separation channel (624) as discussed above for further enhancing contactless communication from the front side of metal transaction card (612) through an area surrounding the transponder chip module (616). Alternative metal transaction cards may not include separation channel (624) such that the invention is not intended to be unnecessarily limited to inclusion of such separation channels (624). The following will address exemplary layers and/or features for metal transaction card (610) with continuous front metal layer (614) and discontinuous rear metal layer (630).

Transponder chip module (616), which may also be referred to as an inductive coupling module (616), has an arrangement of pads (656) on front contact interface and module antenna (628) on a rear, opposing face.

Module antenna (628) has a predetermined number of windings including approximately twelve turns to approximately twenty-four turns. Such particular number of windings may be selected depending on an input capacitance of an RFID chip as desired.

Front chip hole (620) of chip opening (618) has a predetermined shape and a predetermined size to receive transponder chip module (616) in continuous front metal layer (614).

Front metal edge (620) of chip opening (618) surrounds front chip hole (620) defining the boundary, shape, and area configured to receive transponder chip module (616). Ledge inward about front metal edge (620) mechanically supports transponder chip module (616) in metal card body (612) and is formed inside front chip hole (620). In this respect and in this example, such ledge does not reside as a metal ledge in a recess formed around metal edges (620) of chip opening (618).

Rear chip hole (660) of chip opening (618) has a rear metal ledge (662) about edges in discontinuous rear metal layer (630), which includes slit (632A), and is configured to function as a coupling frame. In one example, rear chip hole (660) further receives a slug (626).

Slug (626), with or without an adhesive backing, is received and generally fills rear chip hole (660) of chip opening (618). Slug (626) may be a synthetic insert, laminate, thermosetting resin (e.g., polyurethane), polymeric material, plastic, and/or like insulative, non-conductive material slug (626) to cover this area of chip opening (618). By way of example, such insulative, non-conductive material may be transparent, translucent or pigmented with color. By way of further example, such insulative, non-conductive material may allow the transmission of light therethrough, such as from light emitting diode (LED), and the passage or radio waves. Slug (626) in one or more examples may be replaced by a coating or an encapsulation of thermosetting resin, which may be applied by casting or compression (vacuum or pressure) molding to rear metal layer (630).

Rear metal ledge and edges (662) in the rear metal layer (630) for inductive coupling with coupler coil (638) of booster antenna circuit (634).

Separation channel (624) is configured to permit radio frequency reception and transmission from the front side of front metal layer (614).

Laser Layer (674) represents laser marking a laser reactive protective layer (676) with personalization data.

Laser reactive protective layer (676) includes a coating of matte and/or gloss finish applied using a roller coater and/or screen printer, which may be laser marked for personalization and/or protecting an underlying clear coat of a transparent coat layer (678) rigid ink.

Transparent coat layer (678) of rigid ink, which may also be referred to as a hard coat, is applied for scratch protection over a graphic print layer (682).

Graphic print layer (682) may include stretchable and/or rigid ink deposited on front metal layer (614), such as by a primer to promote adhesion.

A total, cumulative thickness of laser reactive protective layer (676), transparent coat layer (678), and graphic print layer (682) of ink and primer applied to continuous front metal layer (614), in one example, is approximately 40 µm.

Front face metal layer (614), without a slit, may have print layer (682) including ink and/or primer disposed thereon and may have a thickness, in one example, of approximately 203 µm.

Adhesive layer (659), which has a thickness of approximately 25 µm, may include thermosetting epoxy, and is configured to attach magnetic shielding layer (658) to a rear side of front metal layer (614). Such adhesive layer (659) in one or more examples may be replaced by a layer of thermosetting resin with an adhesive coating in the form of a primer.

High permeability magnetic sheet shielding layer (658) has a predetermined thickness of approximately 50 µm to approximately 75 µm. Magnetic sheet shielding layer (658) may include calcium carbonate ($CaCO_3$), silicon dioxide ($SiO_2$), magnesium fluoride ($MgF_2$), SiO2, chromium (Cr) and iron (Fe), to offset the effects of electromagnetic shielding caused by front metal layer (614). In addition, magnetic sheet shielding layer (658) further has booster antenna circuit (634) assembled to a rear face thereof by adhesive layer (659).

Booster antenna circuit (634) may be chemically etched, plated copper tracks, conductive printed tracks, and/or wire embedding attached to high permeability magnetic shielding layer (658) with low magnetic loss ferrite having, in one or more examples, approximately 50 µm to approximately 75 µm in thickness adhesive layer (659). Adhesive layer, in one example is approximately 50 µm thick and attaches to booster antenna circuit (634). Booster antenna circuit (634) includes coupler coil (638) and a set of parallel plate trimming capacitors (646) with booster antenna circuit (634) being assembled on a PET carrier layer, which in one example has a thickness of approximately 23 µm. Coupler coil (638) in one example has approximately 9 windings that extend with a copper track width of approximately 250 µm, spacing between tracks of approximately 100 µm, and copper track thickness of approximately 12 µm to approximately 35 µm for a total cumulative width of approximately 3.05 mm.

Coverage of module antenna (628) overlapping on a footprint of coupler coil (638) in one example is approximately 100% overlap, and more particularly 100% overlap, whereas coverage of coupler coil (638) overlapping metal ledge (662) of chip opening (618) in one example is approximately 50% overlap, and more particularly 50% overlap. Such overlaps are merely exemplary and not intended to unnecessarily limit the invention described herein. In addition, the arrangement of coupler coil (638) on PET carrier layer (668) position coupler coil (638) on a bottom surface on of PET carrier layer (668), but may be located on one or both sides of carrier layer (668) in one or more examples.

Another adhesive layer (688), which has a thickness of approximately 25 µm in one example, includes a thermosetting epoxy and is assembled between a bottom side of booster antenna circuit (634) and rear metal layer (630). In one or more examples, adhesive layer (688) may be replaced by a layer of thermosetting resin (e.g., polyurethane) with an adhesive coating.

Rear metal layer (630) has a thickness of approximately 152 µm and is attached to rear synthetic layers by yet another adhesive layer (690).

Adhesive layer (690) has a thickness of approximately 25 µm in one example, includes thermosetting epoxy, and is attached to rear metal layer (630) and a top side of a synthetic layer (692).

Synthetic layer (692) may be transparent, translucent, white, and/or colored (e.g. PVC, PC, PETG), and may have a thickness of approximately 125 µm.

Card body (612) also includes a primer layer (694) and ink layer (696) for printed information. Positions of primer layer (694) and ink layer (696) may be interchangeable depending on the printing process. In one or more examples, primer layer (694) may be omitted. A thickness of a print layer (696) may be reduced when an ink deposition process is digital.

A laser engravable overlay layer (700), which may be PVC, has a thickness in one example of approximately 60 µm.

A magnetic stripe (702) is mounted to overlay layer (700).

Another laser layer (704) represents laser marking of overlay layer (700) with personalization data and/or security elements, such as a signature panel and/or a hologram.

Again, active communication distance may be further increased in one or more examples by an additional slit (632B) in discontinuous rear metal layer (630). Such additional slit (632B) as shown in the present example laterally extends across tracks of an extended coupler coil (638) to receive surface currents from an electromagnetic field during use.

Figure 12:
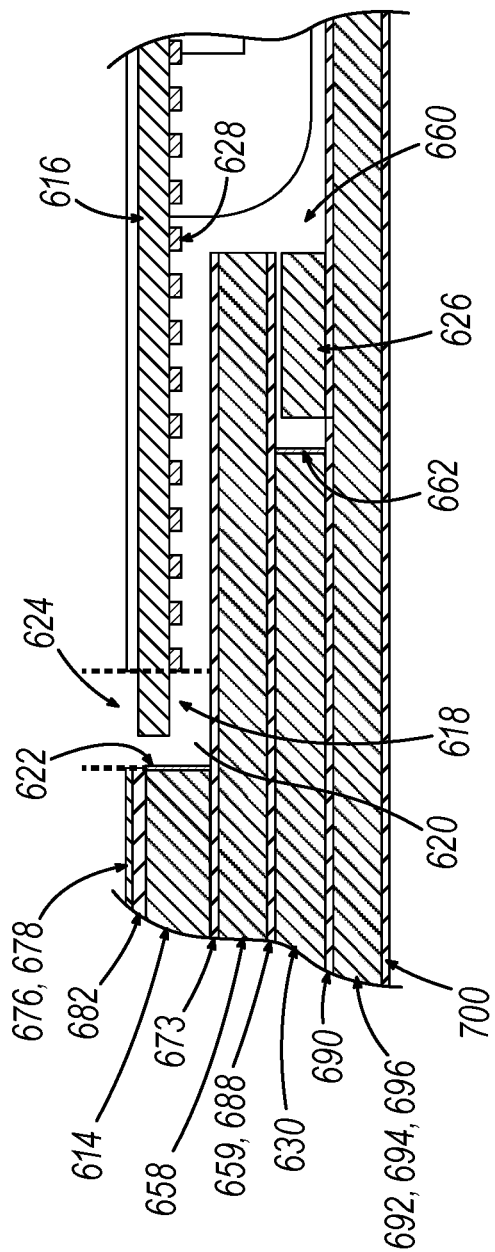
FIG. 12 depicts an enlarged section view of the metal transaction card of FIG. 11.

FIG. 12 shows additional details of transponder chip module (616) in chip opening (618) to more clearly illustrate associated portions of the above stack-up arrangement, particularly with respect to separation channel (624). While the above stack-up arrangement provides one example of metal transaction card (610), it will be appreciated that these features and/or dimensions may vary such that the invention is not intended to be unnecessarily limited to the above stack-up arrangement of metal transaction card (610).

Figure 13:
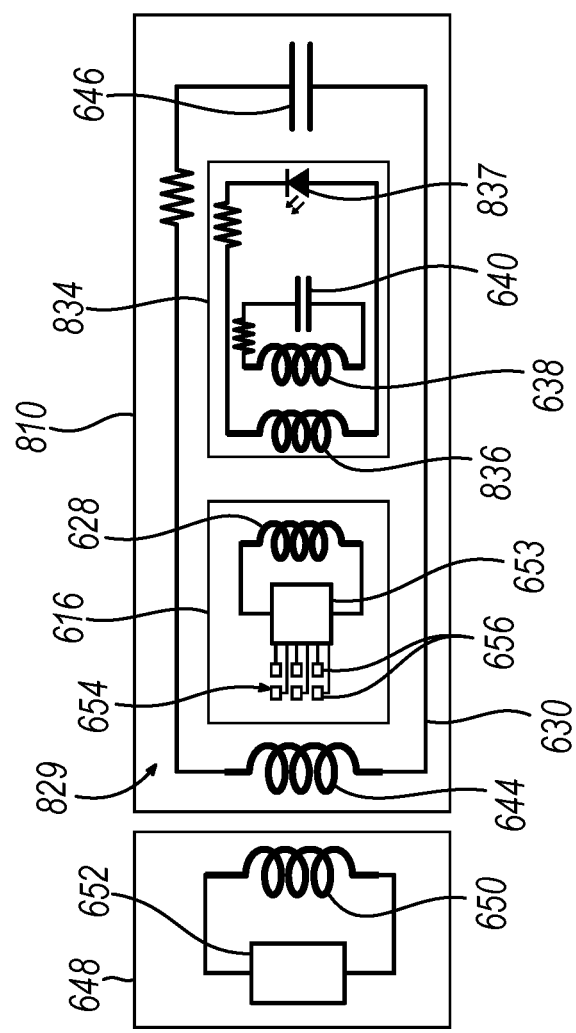
FIG. 13 depicts a schematic view of an eighth example of a metal transaction card with a seventh exemplary inductive coupling arrangement incorporated therein.

C. Various Coupling Arrangements of Discontinuous Metal Layer to Coupler Coil with Additional Independent Perimeter Coil FIG. 13 shows an eighth example of a metal transaction card (810) with a seventh exemplary inductive coupling arrangement (829) incorporated therein. Inductive coupling arrangement (829) of the present examples includes a booster antenna circuit (834) having coupler coil (638) and capacitor bank (640), which is merely optional, as well as an independent perimeter coil (836) electrically separate from coupler coil (638). Coupler coil (638) is configured to inductively couple with discontinuous rear metal layer (630). In addition, coupler coil (638) further inductively couples with module antenna (628) of transponder chip module (616). Electrically separate from coupler coil (638), independent perimeter coil (836) also inductively couples with the discontinuous metal layer (630) to thereby power an electronic component (837), such as a light emitting diode (LED), organic light emitting diode (OLED), a display, and/or a sensor, such as a fingerprint sensor. In this respect, inductive coupling arrangement (829) is similar to inductive coupling arrangement (629) unless otherwise stated herein with like numbers below indicating like features discussed above.

Figure 14:
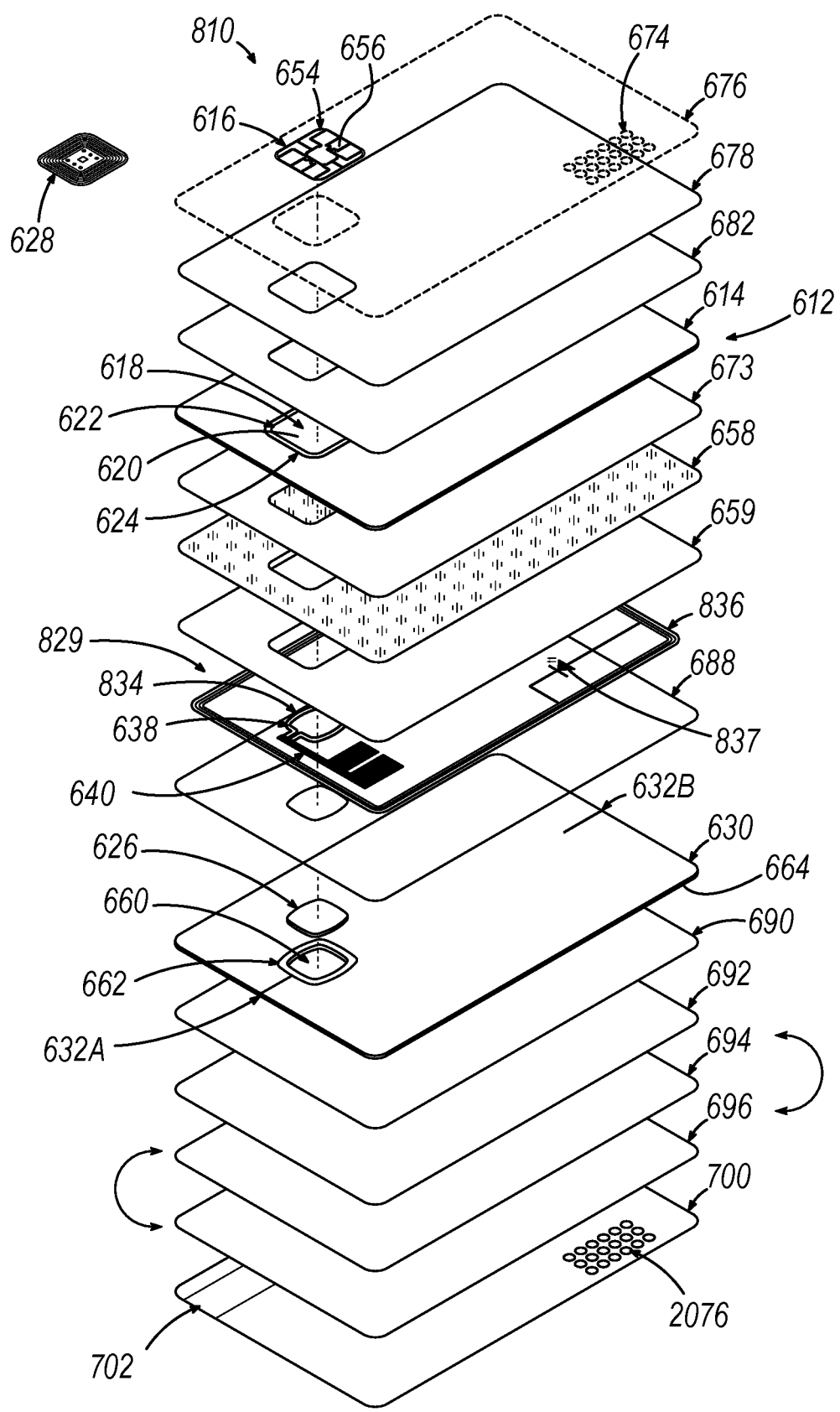
FIG. 14 depicts a disassembled front perspective view of the metal transaction card of FIG. 13 with the inductive coupling arrangement of FIG. 13.

FIG. 14 further shows card body (612) of metal transaction card (810) with inductive coupling arrangement (829) in greater detail. In the present example, inductive coupling arrangement (829) is incorporated into card body (612) such that metal transaction card (810) is like metal transaction card (610) unless otherwise stated herein with like numbers indicating like features. To this end, with respect to FIG. 14, metal transaction card (610) has booster antenna circuit (834) including coupler coil (638), capacitor bank (640), and independent perimeter coil (836) attached to magnetic shielding layer (658), which are adhesively attached to front metal layer (614) via adhesive layers (659, 673). Independent perimeter coil (836) is configured to inductively couple with discontinuous metal layer (630) separately and independently of coupler coil (638) to thereby power an electronic component (837) without deleterious effects on coupler coil (638) powering transducer chip module (616) during use.

IV. Exemplary Combinations

The following examples relate to various non-exhaustive ways in which the teachings herein may be combined or applied. It should be understood that the following examples are not intended to restrict the coverage of any claims that may be presented at any time in this application or in subsequent filings of this application. No disclaimer is intended. The following examples are being provided for nothing more than merely illustrative purposes. It is contemplated that the various teachings herein may be arranged and applied in numerous other ways. It is also contemplated that some variations may omit certain features referred to in the below examples. Therefore, none of the aspects or features referred to below should be deemed critical unless otherwise explicitly indicated as such at a later date by the inventors or by a successor in interest to the inventors. If any claims are presented in this application or in subsequent filings related to this application that include additional features beyond those referred to below, those additional features shall not be presumed to have been added for any reason relating to patentability.

Example 1

A transaction card for communication of a transaction, comprising: a front metal layer including, a first front metal face, and a second front metal face, wherein the first front metal face is transversely opposed from the second front metal face, and wherein the front metal layer does not include a front discontinuity extending transversely therethrough from the first front metal face to the second front metal face; a rear metal layer including a rear outer peripheral edge, a first rear metal face, and a second rear metal face, wherein the first rear metal face is transversely opposed from the second rear metal face; a chip opening including a front chip hole and a rear chip hole, wherein the front chip hole transversely extends from the first front metal face toward the second front metal face thereby defining a front metal edge, and wherein the rear chip hole transversely extends from the first rear metal face toward the second rear metal face thereby defining a rear metal ledge with a rear metal edge; a rear discontinuity extending from the rear outer peripheral edge to the rear metal edge; a transponder chip module having a module antenna and received within the chip opening; and a booster antenna circuit including a coupler coil disposed between the front and rear metal layers, wherein the coupler coil is configured to inductively couple with the rear metal layer for harvesting energy from an electromagnetic field.

Example 2

The transaction card of Example 1, wherein the module antenna is configured to operatively inductively couple with the rear metal layer.

Example 3

The transaction card of Example 2, wherein the module antenna is configured to operatively inductively couple with the rear metal layer via the coupler coil.

Example 4

The transaction card of Example 3, wherein the coupler coil is configured to be inductively coupled between the coupler coil and the rear metal layer.

Example 5

The transaction card of any one or more of Examples 1 through 4, further comprising a separation channel disposed between the front metal edge in the front metal layer and the module antenna for receiving the electromagnet field therethrough.

Example 6

The transaction card of Example 5, wherein the separation channel surrounds the module antenna.

Example 7

The transaction card of any one or more of Examples 1 through 6, further comprising a perimeter coil disposed between the front and rear metal layers and configured to inductively couple with the rear metal layer independent of the coupler coil for harvesting energy from the electromagnetic field.

Example 8

The transaction card of Example 7, wherein the perimeter coil is configured to inductively couple with the rear metal layer independent of inductive coupling of the coupler coil with the rear metal layer.

Example 9

The transaction card of Example 8, further comprising an electronic accessory component operatively connected to the perimeter coil, and wherein the perimeter coil is configured to power the electronic accessory component.

Example 10

The transaction card of Example 9, wherein the electronic accessory component includes at least one of a light emitting diode, a display, or a sensor.

Example 11

The transaction card of Example 10, wherein the electronic accessory component includes the sensor, and wherein the sensor is a fingerprint sensor.

Example 12

The transaction card of any one or more of Examples 1 through 11, further comprising a magnetic shielding layer disposed between the front and rear metal layers.

Example 13

The transaction card of Example 12, wherein the booster antenna circuit does not include a perimeter coil.

Example 14

The transaction card of any one or more of Examples 1 through 14, wherein the module antenna overlaps the coupler coil, and wherein the coupler coil overlaps the rear metal ledge.

Example 15

The transaction card of Example 14, wherein the module antenna overlaps the coupler coil with approximately 100% overlap.

Example 16

The transaction card of Example 15, wherein the coupler coil overlaps the rear metal ledge with approximately 50% overlap.

Example 17

The transaction card of Example 14, wherein the coupler coil overlaps the rear metal ledge with approximately 50% overlap.

Example 18

A transaction card for communication of a transaction, comprising: a front metal layer including, a first front metal face, and a second front metal face, wherein the first front metal face is transversely opposed from the second front metal face; a rear metal layer including a rear outer peripheral edge, a first rear metal face, and a second rear metal face, wherein the first rear metal face is transversely opposed from the second rear metal face; a rear discontinuity extending through the rear metal layer; a chip opening in at least one of the front and rear metal layers; a transponder chip module having a module antenna and received within the chip opening; a booster antenna circuit including a coupler coil disposed between the front and rear metal layers, wherein the coupler coil is configured to inductively couple with the rear metal layer for harvesting energy from an electromagnetic field, wherein the booster antenna circuit does not include a perimeter coil; and a perimeter coil disposed between the front and rear metal layers and configured to inductively couple with the rear metal layer independent of the coupler coil for harvesting energy from the electromagnetic field.

Example 19

The transaction card of Example 18, wherein the front metal layer does not include a front discontinuity extending transversely therethrough from the first front metal face to the second front metal face.

Example 20

A transaction card for communication of a transaction, comprising: a front metal layer including, a first front metal face, and a second front metal face, wherein the first front metal face is transversely opposed from the second front metal face, and wherein the front metal layer does not include a front discontinuity extending transversely therethrough from the first front metal face to the second front metal face; a rear metal layer including a rear outer peripheral edge, a first rear metal face, and a second rear metal face, wherein the first rear metal face is transversely opposed from the second rear metal face; a magnetic shielding layer disposed between the front and rear metal layers; a chip opening including a front chip hole and a rear chip hole, wherein the front chip hole transversely extends from the first front metal face toward the second front metal face thereby defining a front metal edge, and wherein the rear chip hole transversely extends from the first rear metal face toward the second rear metal face thereby defining a rear metal ledge with a rear metal edge; a rear discontinuity extending from the rear outer peripheral edge to the rear metal edge; a transponder chip module having a module antenna and received within the chip opening; and a booster antenna circuit including a coupler coil disposed between the front and rear metal layers, wherein the coupler coil is configured to inductively couple with the rear metal layer for harvesting energy from an electromagnetic field, wherein the module antenna is configured to operatively inductively couple with the rear metal layer via the coupler coil.

V. Miscellaneous

It should be appreciated that any patent, publication, or other disclosure material, in whole or in part, that is said to be incorporated by reference herein is incorporated herein only to the extent that the incorporated material does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

Examples of transaction cards having one or more features associated with RFID technology, such as RFID enabled metal transaction cards, are described in U.S. Pat. No. 9,475,086, entitled "Smartcard with Coupling Frame and Method of Increasing Activation Distance of a Transponder Chip Module," issued Oct. 25, 2016, the disclosure of which is incorporated by reference herein, in its entirety; U.S. Pat. No. 9,798,968, entitled "Smartcard with Coupling Frame and Method of Increasing Activation Distance of a Transponder Chip Module," issued Oct. 24, 2017, the disclosure of which is incorporated by reference herein, in its entirety; U.S. Pat. No. 9,836,684, entitled "Smart Cards, Payment Objects and Methods," issued Dec. 5, 2017, the disclosure of which is incorporated by reference herein, in its entirety; U.S. Pat. No. 6,378,774, entitled "IC Module and Smart Card," issued Apr. 30, 2002, the disclosure of which is incorporated by reference herein, in its entirety; U.S. Pat. No. 6,452,563, entitled "Antenna Arrangement in a Metallic Environment," issued Sep. 17, 2002, the disclosure of which is incorporated by reference herein, in its entirety; U.S. Pat. No. 7,701,350, entitled "IC Tag and Method for Fabricating the Same," issued Apr. 20, 2010, the disclosure of which is incorporated by reference herein, in its entirety; U.S. Pat. No. 9,231,305, entitled "Wireless IC Device," issued Jan. 5, 2016, the disclosure of which is incorporated by reference herein, in its entirety; U.S. Pat. No. 8,608,082, entitled "Microcircuit Device Including Means for Amplifying the Gain of an Antenna," issued Dec. 17, 2013, the disclosure of which is incorporated by reference herein, in its entirety; U.S. Pat. No. 8,737,915, entitled "License Plates for a Vehicle," issued May 27, 2014, the disclosure of which is incorporated by reference herein, in its entirety; U.S. Pat. No. 9,836,687, entitled "Ceramic-containing Transaction Cards and Methods of Making the Same," issued Dec. 5, 2017, the disclosure of which is incorporated by reference herein, in its entirety; U.S. Pat. No. 10,140,569, entitled "Metal Contactless Smart Card and Method for Fabricating the Same," issued Nov. 27, 2018, the disclosure of which is incorporated by reference herein, in its entirety; U.S. Pat. No. 11,009,855, entitled "Metal Card and Method for Manufacturing the Same," issued May 18, 2021, the disclosure of which is incorporated by reference herein, in its entirety; and EP 0 494 471, entitled "Locks," issued Oct. 4, 1996, the disclosure of which is incorporated by reference herein, in its entirety.

Examples of transaction cards having one or more features associated with RFID technology, such as RFID enabled metal transaction cards, are described in U.S. Pat. Pub. No. 2013/0126622, entitled "Offsetting Shielding and Enhancing Coupling in Metallized Smart Cards," published May 23, 2013, the disclosure of which is incorporated by reference herein, in its entirety; U.S. Pat. Pub. No. 2022/0058457, entitled "Method for Producing a Metal Radio-frequency Chip Card with Improved Electromagnetic Permittivity," published Feb. 24, 2022, the disclosure of which is incorporated by reference herein, in its entirety; U.S. Pat. Pub. No. 2012/0112971, entitled "Antenna Unit and Portable Wireless Device Equipped with the Same," published May 10, 2012, the disclosure of which is incorporated by reference herein, in its entirety; U.S. Pat. Pub. No. 2011/0227799, entitled "Antenna and Portable Terminal Using the Same," published Sep. 22, 2011, the disclosure of which is incorporated by reference herein, in its entirety; U.S. Pat. Pub. No. 2014/0231503, entitled "Universal IC Tag, Method of Manufacturing Same, and Communication Management System," published Aug. 21, 2014, the disclosure of which is incorporated by reference herein, in its entirety; W.O. Pat. Pub. No. 2019/173455, entitled "Metal Card," published Sep. 12, 2019, the disclosure of which is incorporated by reference herein, in its entirety; U.S. Pat. Pub. No. 2020/0034578, entitled "Smartcard with Display and Energy Harvesting," published Jan. 30, 2020, the disclosure of which is incorporated by reference herein, in its entirety; W.O. Pat. Pub. No. 2021/110515, entitled "Method for Manufacturing a Radio Frequency Smart Card Comprising a Metal Plate with a Slot in the Plate," published Jun. 10, 2021, the disclosure of which is incorporated by reference herein, in its entirety.

Having shown and described various embodiments of the present invention, further adaptations of the methods and systems described herein may be accomplished by appropriate modifications by one of ordinary skill in the art without departing from the scope of the present invention. Several of such potential modifications have been mentioned, and others will be apparent to those skilled in the art. For instance, the examples, embodiments, geometrics, materials, dimensions, ratios, steps, and the like discussed above are illustrative and are not required. Accordingly, the scope of the present invention should be considered in terms of the following claims and is understood not to be limited to the details of structure and operation shown and described in the specification and drawings.

We claim:

1. A transaction card for communication of a transaction, comprising:
    a front metal layer including, a first front metal face, and a second front metal face, wherein the first front metal face is transversely opposed from the second front metal face, and wherein the front metal layer does not include a front discontinuity extending transversely therethrough from the first front metal face to the second front metal face;
    a rear metal layer including a rear outer peripheral edge, a first rear metal face, and a second rear metal face, wherein the first rear metal face is transversely opposed from the second rear metal face;
    a chip opening including a front chip hole and a rear chip hole, wherein the front chip hole transversely extends from the first front metal face toward the second front metal face thereby defining a front metal edge, and wherein the rear chip hole transversely extends from the first rear metal face toward the second rear metal face thereby defining a rear metal ledge with a rear metal edge;
    a rear discontinuity extending from the rear outer peripheral edge to the rear metal edge;
    a transponder chip module having a module antenna and received within the chip opening; and
    a booster antenna circuit including a coupler coil disposed between the front and rear metal layers, wherein the coupler coil is configured to inductively couple with the rear metal layer for harvesting energy from an electromagnetic field.

2. The transaction card of claim 1, wherein the module antenna is configured to operatively inductively couple with the rear metal layer.

3. The transaction card of claim 2, wherein the module antenna is configured to operatively inductively couple with the rear metal layer via the coupler coil.

4. The transaction card of claim 3, wherein the coupler coil is configured to be inductively coupled between the coupler coil and the rear metal layer.

5. The transaction card of claim 1, further comprising a separation channel disposed between the front metal edge in the front metal layer and the module antenna for receiving the electromagnet field therethrough.

6. The transaction card of claim 5, wherein the separation channel surrounds the module antenna.

7. The transaction card of claim 1, further comprising a perimeter coil disposed between the front and rear metal layers and configured to inductively couple with the rear metal layer independent of the coupler coil for harvesting energy from the electromagnetic field.

8. The transaction card of claim 7, wherein the perimeter coil is configured to inductively couple with the rear metal layer independent of inductive coupling of the coupler coil with the rear metal layer.

9. The transaction card of claim 8, further comprising an electronic accessory component operatively connected to the perimeter coil, and wherein the perimeter coil is configured to power the electronic accessory component.

10. The transaction card of claim 9, wherein the electronic accessory component includes at least one of a light emitting diode, a display, or a sensor.

11. The transaction card of claim 10, wherein the electronic accessory component includes the sensor, and wherein the sensor is a fingerprint sensor.

12. The transaction card of claim 1, further comprising a magnetic shielding layer disposed between the front and rear metal layers.

13. The transaction card of claim 12, wherein the booster antenna circuit does not include a perimeter coil.

14. The transaction card of claim 1, wherein the module antenna overlaps the coupler coil, and wherein the coupler coil overlaps the rear metal ledge.

15. The transaction card of claim 14, wherein the module antenna overlaps the coupler coil with approximately 100% overlap.

16. The transaction card of claim 15, wherein the coupler coil overlaps the rear metal ledge with approximately 50% overlap.

17. The transaction card of claim 14, wherein the coupler coil overlaps the rear metal ledge with approximately 50% overlap.

18. A transaction card for communication of a transaction, comprising:
    a front metal layer including, a first front metal face, and a second front metal face, wherein the first front metal face is transversely opposed from the second front metal face;
    a rear metal layer including a rear outer peripheral edge, a first rear metal face, and a second rear metal face, wherein the first rear metal face is transversely opposed from the second rear metal face;
    a rear discontinuity extending through the rear metal layer;
    a chip opening in at least one of the front and rear metal layers;
    a transponder chip module having a module antenna and received within the chip opening;
    a booster antenna circuit including a coupler coil disposed between the front and rear metal layers, wherein the coupler coil is configured to inductively couple with the rear metal layer for harvesting energy from an electromagnetic field, wherein the booster antenna circuit does not include a perimeter coil; and a perimeter coil disposed between the front and rear metal layers and configured to inductively couple with the rear metal layer independent of the coupler coil for harvesting energy from the electromagnetic field, wherein the front metal layer does not include a front discontinuity extending transversely therethrough from the first front metal face to the second front metal face.

19. A transaction card for communication of a transaction, comprising:

a front metal layer including, a first front metal face, and a second front metal face, wherein the first front metal face is transversely opposed from the second front metal face, and wherein the front metal layer does not include a front discontinuity extending transversely therethrough from the first front metal face to the second front metal face;

a rear metal layer including a rear outer peripheral edge, a first rear metal face, and a second rear metal face, wherein the first rear metal face is transversely opposed from the second rear metal face;

a chip opening including a front chip hole and a rear chip hole, wherein the front chip hole transversely extends from the first front metal face toward the second front metal face thereby defining a front metal edge, and wherein the rear chip hole transversely extends from the first rear metal face toward the second rear metal face thereby defining a rear metal ledge with a rear metal edge;

a rear discontinuity extending from the rear outer peripheral edge to the rear metal edge;

a transponder chip module having a module antenna and received within the chip opening;

a booster antenna circuit including a coupler coil disposed between the front and rear metal layers, wherein the coupler coil is configured to inductively couple with the rear metal layer for harvesting energy from an electromagnetic field; and a magnetic shielding layer disposed between the front and rear metal layers, wherein the booster antenna circuit does not include a perimeter coil.

20. A transaction card for communication of a transaction, comprising:

a front metal layer including, a first front metal face, and a second front metal face, wherein the first front metal face is transversely opposed from the second front metal face, and wherein the front metal layer does not include a front discontinuity extending transversely therethrough from the first front metal face to the second front metal face;

a rear metal layer including a rear outer peripheral edge, a first rear metal face, and a second rear metal face, wherein the first rear metal face is transversely opposed from the second rear metal face;

a chip opening including a front chip hole and a rear chip hole, wherein the front chip hole transversely extends from the first front metal face toward the second front metal face thereby defining a front metal edge, and wherein the rear chip hole transversely extends from the first rear metal face toward the second rear metal face thereby defining a rear metal ledge with a rear metal edge;

a rear discontinuity extending from the rear outer peripheral edge to the rear metal edge;

a transponder chip module having a module antenna and received within the chip opening; and a booster antenna circuit including a coupler coil disposed between the front and rear metal layers, wherein the coupler coil is configured to inductively couple with the rear metal layer for harvesting energy from an electromagnetic field, wherein the module antenna overlaps the coupler coil, and wherein the coupler coil overlaps the rear metal ledge.

* * * * *